Figure 3:
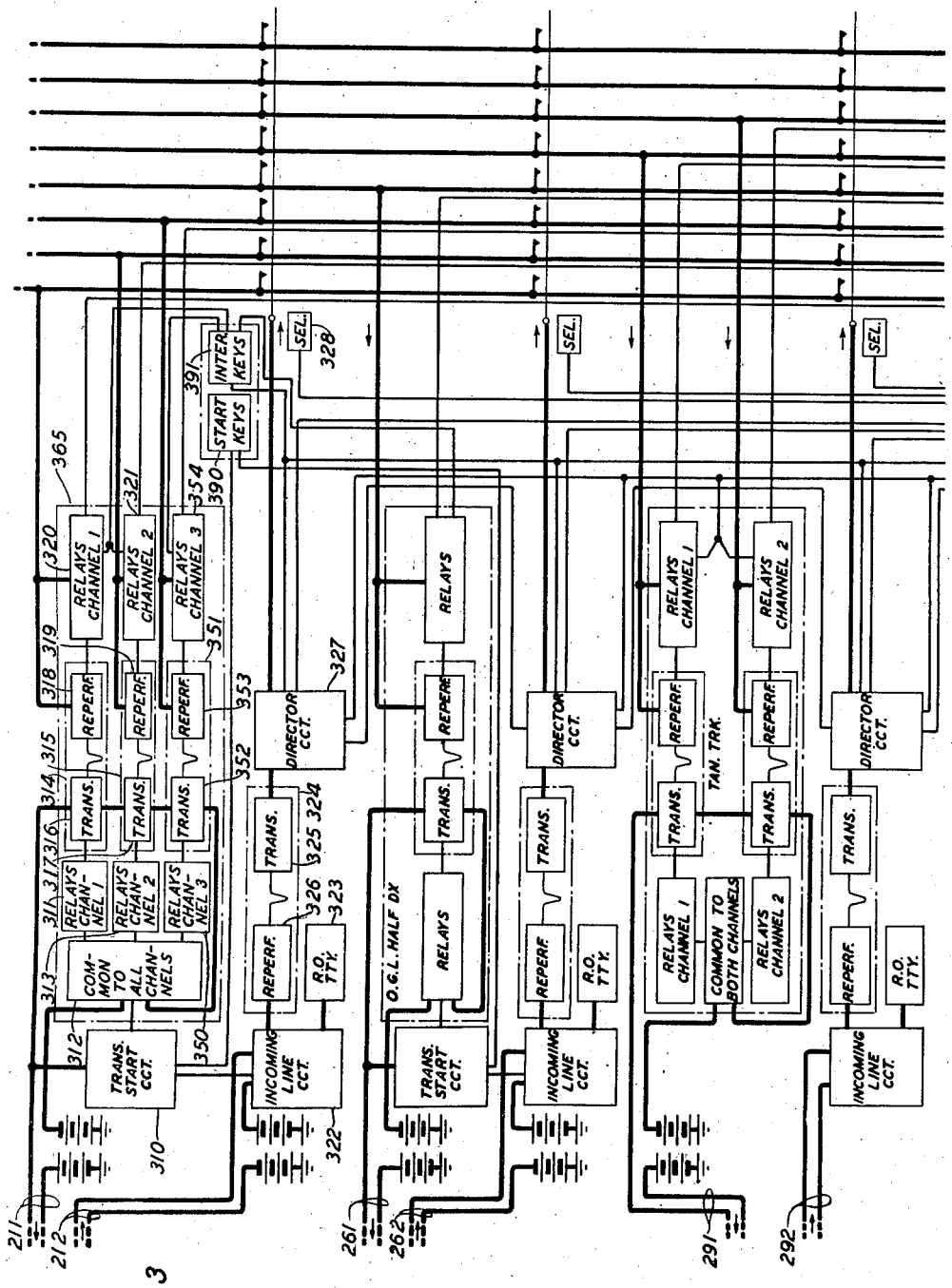

Nov. 23, 1948.  W. M. BACON  2,454,301
TELEGRAPH SYSTEM
Filed April 7, 1943  14 Sheets-Sheet 1
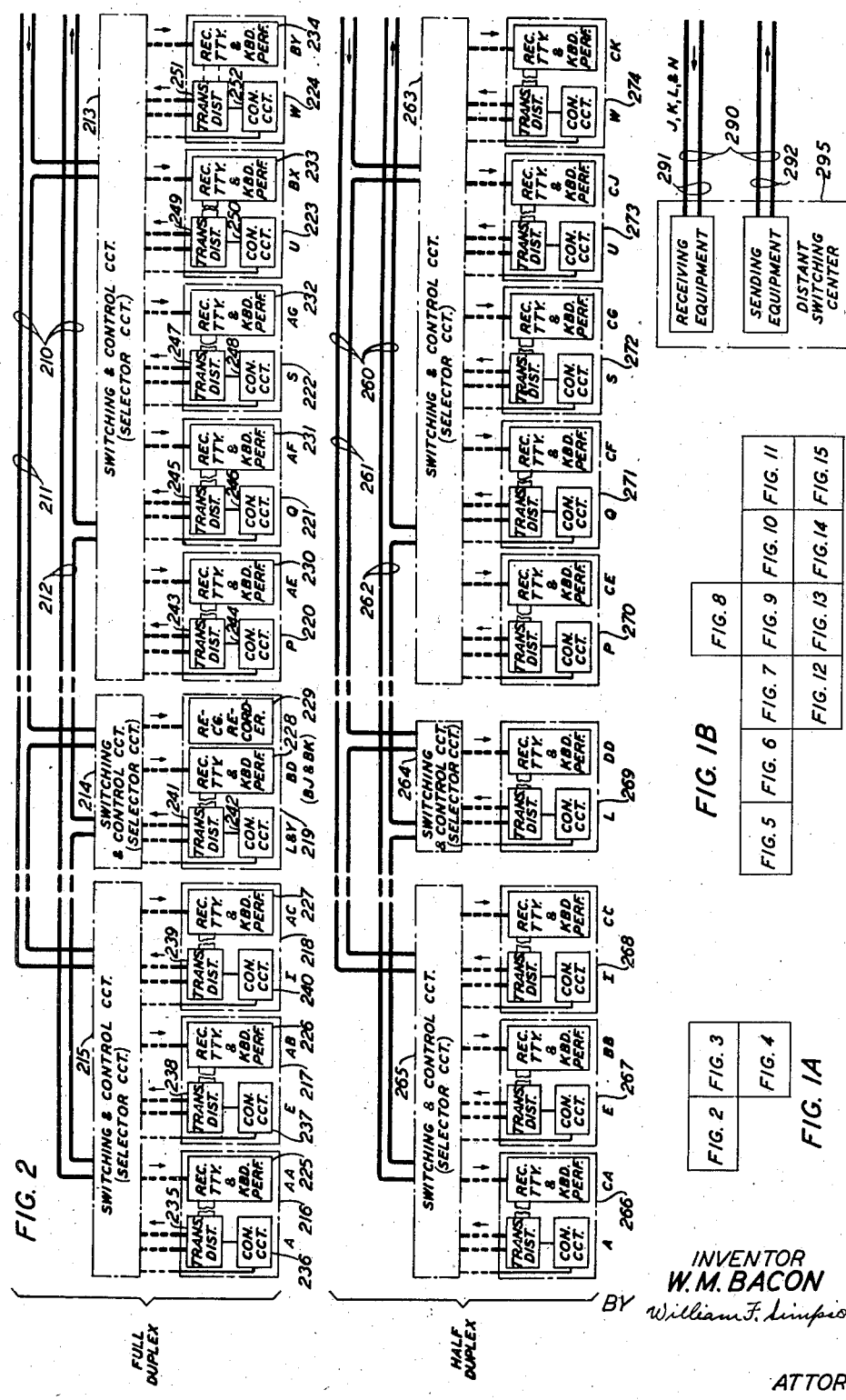
INVENTOR
W. M. BACON
BY William F. Simpson
ATTORNEY Nov. 23, 1948.   W. M. BACON   2,454,301
TELEGRAPH SYSTEM
Filed April 7, 1943   14 Sheets-Sheet 4

INVENTOR
W. M. BACON
BY
William F. Simpson
ATTORNEY

Nov. 23, 1948.  W. M. BACON  2,454,301
TELEGRAPH SYSTEM
Filed April 7, 1943  14 Sheets-Sheet 5

INVENTOR
W. M. BACON
BY William F. Simpson
ATTORNEY

INVENTOR
W. M. BACON
BY William F. Simpson
ATTORNEY

Patented Nov. 23, 1948

2,454,301

UNITED STATES PATENT OFFICE 2,454,301

TELEGRAPH SYSTEM

Walter M. Bacon, New York, N. Y., assignor to Bell Telephone Laboratories, Incorporated, New York, N. Y., a corporation of New York Application April 7, 1943, Serial No. 482,074

17 Claims. (Cl. 178—2)

This invention relates to telegraph systems and more particularly to automatic switching telegraph systems.

An object of this invention is to provide an improved telegraph switching system capable of selectively and more expeditiously transmitting messages from one station to another station under control of directing or address characters preceding the communications or messages to the various stations in which a plurality of different classes of service are provided for different classes of messages or alternatively to different stations of the telegraph system.

This invention relates to automatic telegraph systems wherein a plurality of outlying telegraph stations are connected to a central switching station by means of party lines, that is, lines which extend from a plurality of outlying stations to the central switching station. Equipment is provided at the central station for storing messages received from the party line and later selectively transmitting the messages to the party line and thence to the proper station.

A typical telegraph system to which this invention is applicable is disclosed in copending application of Branson et al., Serial No. 448,878, filed June 27, 1942, Patent No. 2,430,447, dated Nov. 11, 1947, which application is hereby made a part of this application as if fully included herein.

In accordance with the present invention provision has been made for providing different classes of service in such a system. In other words, provision has been made to permit one class or group of messages to be handled more expeditiously than another class or group of messages.

Alternatively, provision has been made to permit messages directed to any predetermined or group of predetermined stations of a party line to be handled more expeditiously than messages to other stations of the same party line.

Systems of this type are particularly advantageous where the messages of one group are much longer or shorter than the messages of the other group. Under these circumstances, it will usually be desirable to provide more opportunities for transmission of the shorter messages because there will usually be more of them. When the transmission is thus controlled in accordance with this invention, it may happen that the overall transmission of messages over the system is expedited.

In accordance with the present invention, messages which it is desired to handle more expeditiously are preceded by address codes different from the address codes preceding regular messages or alternatively if it is desired to transmit regular messages and defer other messages, the address codes preceding the messages of the different classes to the same station or destination will be different. The switching equipment at the central switching station directs these messages in accordance with their address codes to repeating circuits associated with the party lines. One group of repeating circuits is provided for one group or class of messages, while a second repeating circuit or group of repeating circuits is provided for another group of messages. As indicated above, these different groups of messages may all be directed to any of the stations of the party line or they may be directed to certain specific stations or group of stations of the party line.

Control circuits are provided for controlling the transmission of the messages over the party line to the respective stations served thereby. In accordance with the present invention a control circuit is arranged for scheduling or providing opportunities for transmission from the respective groups of repeating or transmission devices associated with the party line.

In accordance with the present invention each of the groups of different classes of service is provided with more or less opportunities to transmit or repeat messages over the associated party lines. By providing this arrangement, instead of providing absolute preference for one class of service, it is possible for a certain number of messages to be transmitted from the inferior message group without waiting until all the messages of the other group have been transmitted. In other words, by providing the present arrangement, too great a disparity is avoided between the two groups or classes of messages transmitted to the system. Furthermore, it is possible to easily control the degree of difference between the two services merely by changing a group of connections or cross-connections provided for that purpose.

It is sometimes desirable to provide switching apparatus so that the degree of difference between the two groups of messages or between the two services may be rapidly changed. For example, during certain hours of the day it may be desirable to provide a large degree of difference between the messages as, for example, during the rush periods of the day and at other times to deal with all of the messages on a more nearly equal basis. Again, in case a party line extends to stations in different time zones, during certain hours of the day it may be desirable to transmit messages to one station or to a group of stations more expeditiously than to a second station or group of stations while at other hours of the day it may be desirable to transmit all messages to both stations or both groups of stations with a minimum delay and at still other hours of the day it may be desirable to transmit messages to the second group of stations more expeditiously than to the first group of stations.

A further object of this invention is to provide switching apparatus for rapidly changing the relative frequency of transmission of messages from the different groups of messages when messages from all groups are awaiting transmission. Furthermore, in accordance with the present invention the maximum delay of the inferior message service is reduced and prevented from becoming excessive in case a large number of preferred messages are received.

The foregoing objects and features of the invention are not limited to two classes of message service, but may be applied to a greater plurality of classes of message service by merely providing a repeating device or a group of repeating devices for each class of message or service for transmission over the respective party lines and providing more or less opportunities for transmission from the different groups, in accordance with the present invention.

Figure 4:
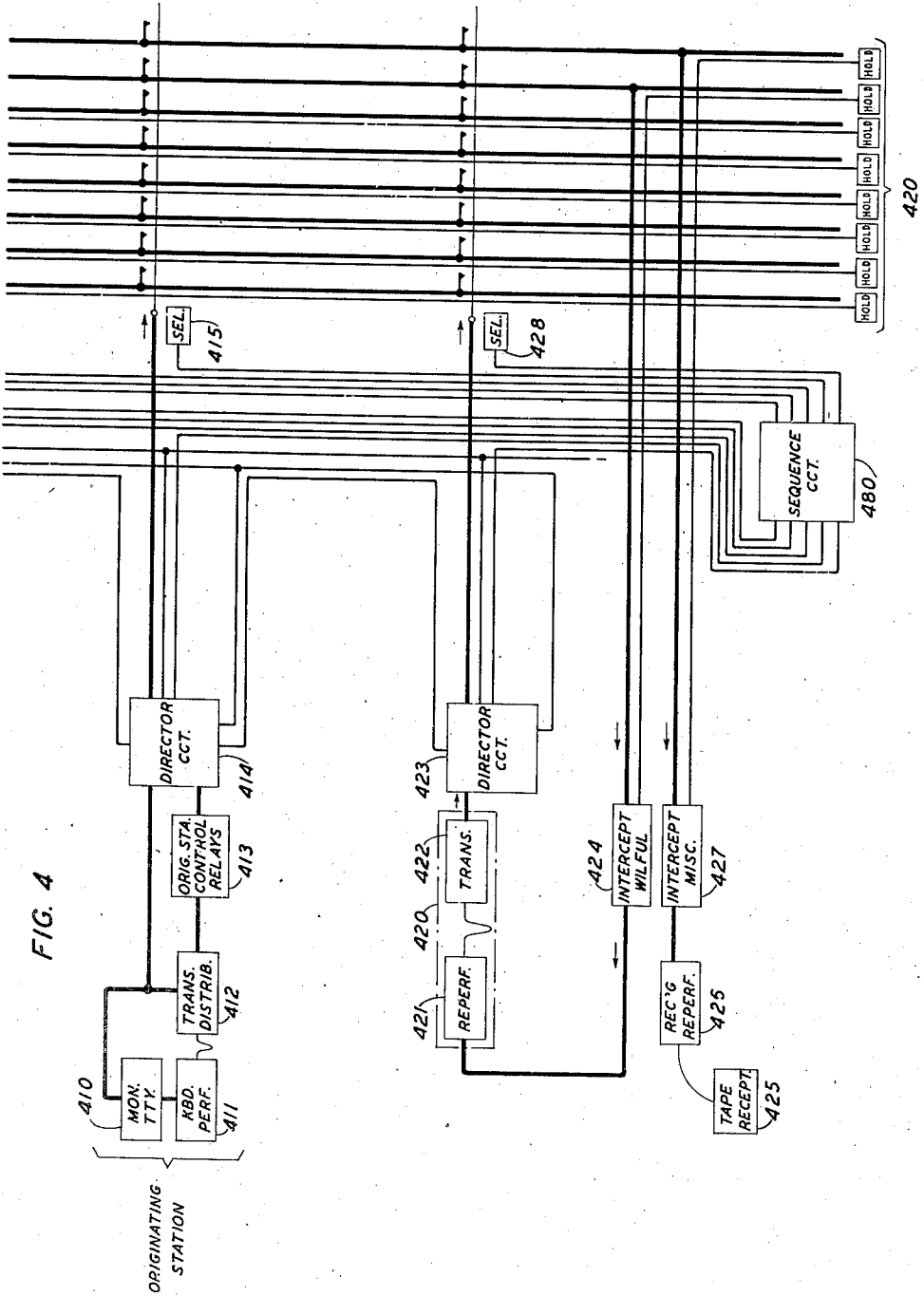

The foregoing objects and features of this invention, the novelty of which is specifically recited in the claims appended hereto, may be more readily understood from the following description when read with reference to the attached drawings in which:

Figs. 1A and 1B illustrate the manner in which the other figures of the drawing are arranged adjacent each other;

Figs. 2, 3 and 4 when positioned as shown in Fig. 1A, illustrate in outline form representative components of a typical automatic telegraph switching system in which a specific embodiment of this invention has been incorporated; and Figs. 5 through 15, inclusive, when arranged as shown in Fig. 1B, show in greater detail one specific embodiment of the invention incorporated in a system shown in Figs. 2, 3 and 4, and which is similar to the system described in the above-identified copending application of Branson et al.

Referring now to Figs. 2, 3 and 4 when arranged as shown in Fig. 1A, Fig. 2 shows two typical party lines and the station and control equipment associated therewith. One party line is designated 210 which comprises a receiving channel 211 and a transmitting channel 212. Similarly, party line 260 comprises a receiving channel 261 and a transmitting channel 262. A typical trunk circuit 290 also comprising a transmitting channel and a receiving channel extends to a second switching center 295 similar to the switching center shown in Figs. 3 and 4 and described hereinafter.

Both transmitting and receiving channels are illustrated in Fig. 2 and also in Fig. 3 by means of telegraph lines or conductors. It is to be understood, however, that these lines or channels may include any type of telegraph transmission equipment suitable for the transmission of telegraph signaling pulses or code combinations of pulses. These lines or channels may, for example, include open wire lines, cable lines, channels of voice frequency or high frequency carrier current systems, radio systems, time division multiplex systems or telegraph channels of composite telephone and telegraph transmission systems, full duplex telegraph transmission systems, or of any other type of pulse transmission channels or systems suitable for the transmission of signaling pulses such as employed in telegraph systems. The various party lines and channels thereof may include or comprise any or all of the foregoing types of transmission systems or any or all combinations of such types of transmission systems.

The transmission systems of the various types comprising the party lines operate in their usual and well understood manner and the operation, therefore, need not be included herein because it would serve no useful purpose and only tend to obscure the other elements and features of the present invention.

Each of the party lines shown in Fig. 2 extends to a plurality of outlying subscriber or way stations. It is to be understood also that it is within the scope of this invention to extend lines individually from one or more of the outlying stations to the central switching exchange. In this case certain of the control equipment associated with each of the party lines need not be provided as will be readily apparent to those skilled in the art.

Each of the lines which extend to more than one outlying station is provided with control equipment located at or near the outlying stations of the party line. Control equipment may be provided which is individual to each of the outlying or way stations in case the way stations are rather widely separated or control equipment may be provided common to a group of outlying stations which are located more closely together. In addition, certain of the control equipment may be individual to certain outlying stations, while other control equipment provided for the same party line may be common to a plurality of the outlying stations.

As shown in Fig. 2, three separate and distinct sets of switching and controlling circuits, sometimes referred to as a secondary switching center, are associated with each of the party lines. For example, party line 210 extends to the switching and control circuits or secondary switching centers 213, 214 and 215. The control equipment 214 is individual to station 219. Control equipment 215 is common to stations 216, 217 and 218, while control equipment 213 is common to stations 220 to 224, inclusive. Each of the outlying stations is provided with a receiving instrument, transmitting apparatus, and control equipment. In the specific system described herein, the transmitting apparatus comprises a keyboard perforator for perforating paper tape in accordance with the signals to be transmitted and a tape controlled transmitter for transmitting signals in accordance with the perforations in the tape. For example, the receiving instrument and the keyboard perforator are illustrated diagrammatically and designated 225 at station 216 of Fig. 2, the transmitting distributor is designated 235, while the control equipment is designated 236. Similar equipment is provided at the other stations. Station 219 is provided with an additional receiving recorder or reperforator for again perforating tape in accordance with messages received from the system. This reperforator is provided at those stations at which other telegraph lines or circuits may terminate so that the messages intended for stations connected to these other lines may be recorded at station 219 and later automatically transmitted over the proper line without requiring the time of an operator to retransmit the message.

In order to transmit messages over this system, the attendant or subscriber at the outlying or way stations perforates messages in paper tapes for later transmission over the system. Preceding each message, an address or group of switching signals is perforated in the tape and following each message an end of message signal is also perforated in the tape. Following the end of message signal, a subscriber may perforate any address signal followed by another message intended for the station designated by the address. The subscriber, of course, may perforate any number of letters signals in the tape at the beginning of the tape, at the end of the tape, or between messages. The subscriber may also perforate letters signals between various portions of the address or switching codes or between these signals and the message as described in greater detail in the above-identified application of Branson et al. Furthermore, the operator or attendant will usually perforate an end of the transmission signal in the tape after the end of message signal following the last message available for transmission.

The attendant or operator at the outlying station will then insert a tape in the transmitter for transmission over the system. At a later time the transmitter is started under the control of an operator or under control of automatic switching circuits at the central switching station. Thereafter the messages are transmitted to the central switching station and recorded thereat.

The circuits at the central switching station are illustrated in Figs. 3 and 4. Fig. 4 shows the originating position at the central switching station comprising a keyboard perforator 411, a monitoring receiving instrument 410, transmitter or transmitting distributor 412, control relays 413 and a director circuit 414. Fig. 4 also shows a miscellaneous intercept circuit 427 which cooperates with a receiving reperforator 426 and a tape receptacle 425. A wilful intercept circuit 424 is also shown. This intercept circuit is provided with a repeating instrument 420 comprising a recorder or reperforator 421 and a transmitting device 422. A director 423 is also associated with the wilful intercept circuit.

Each of the party lines terminating at the switching office is provided with an incoming line circuit 322 and a receiving only machine 323, a storage instrument 326 and associated transmitter 325. Incoming line circuit 322 causes the messages intended for the central switching station to be recorded on the receiving only receiver 323 and causes the messages intended for other stations of the system to be recorded by the reperforator 326. Director circuit 327 is associated with the transmitter 325 and serves to connect the transmitter 325 selectively to equipment associated with any of the lines terminating at the central switching station under control of the address characters preceding each message.

Each of the party lines is also provided with a transmitter start circuit, such as 310, and outgoing line circuits and equipment 365 for transmitting messages over the party line. The outgoing line circuit associated with party line 210 and particularly the receiving channel 211 thereof, incorporates control circuits and equipment in accordance with the present invention as will be described hereinafter. Briefly, messages directed to stations of party line 210 are transmitted to storage repeaters associated with line 210 under control of address signal or signals preceding the messages by the director circuits of the lines upon which the messages originate for later transmission over the outgoing lines.

Figs. 2 and 3 also show a trunk circuit 290 comprising two transmission channels 291 and 292 extending to a distant switching center 295. The terminal equipment associated with the trunk circuits is similar to the terminal equipment associated with each of the party lines as described above.

The operation of the various circuits referred to above is described in detail in the above-identified copending patent application of Branson et al.

Since the respective circuits referred to above forming parts of the system referred to herein operate in substantially the same manner as described above in said patent application of Branson et al., which patent application has been made a part hereof as if fully included herein, the detailed description of the operation of all of these circuits need not be repeated at this point.

In addition, the apparatus located at the subscriber's stations, at the secondary switching centers, and at the central switching station are of substantially the same types as shown and described in the above-identified application of Branson et al.

Figure 5:
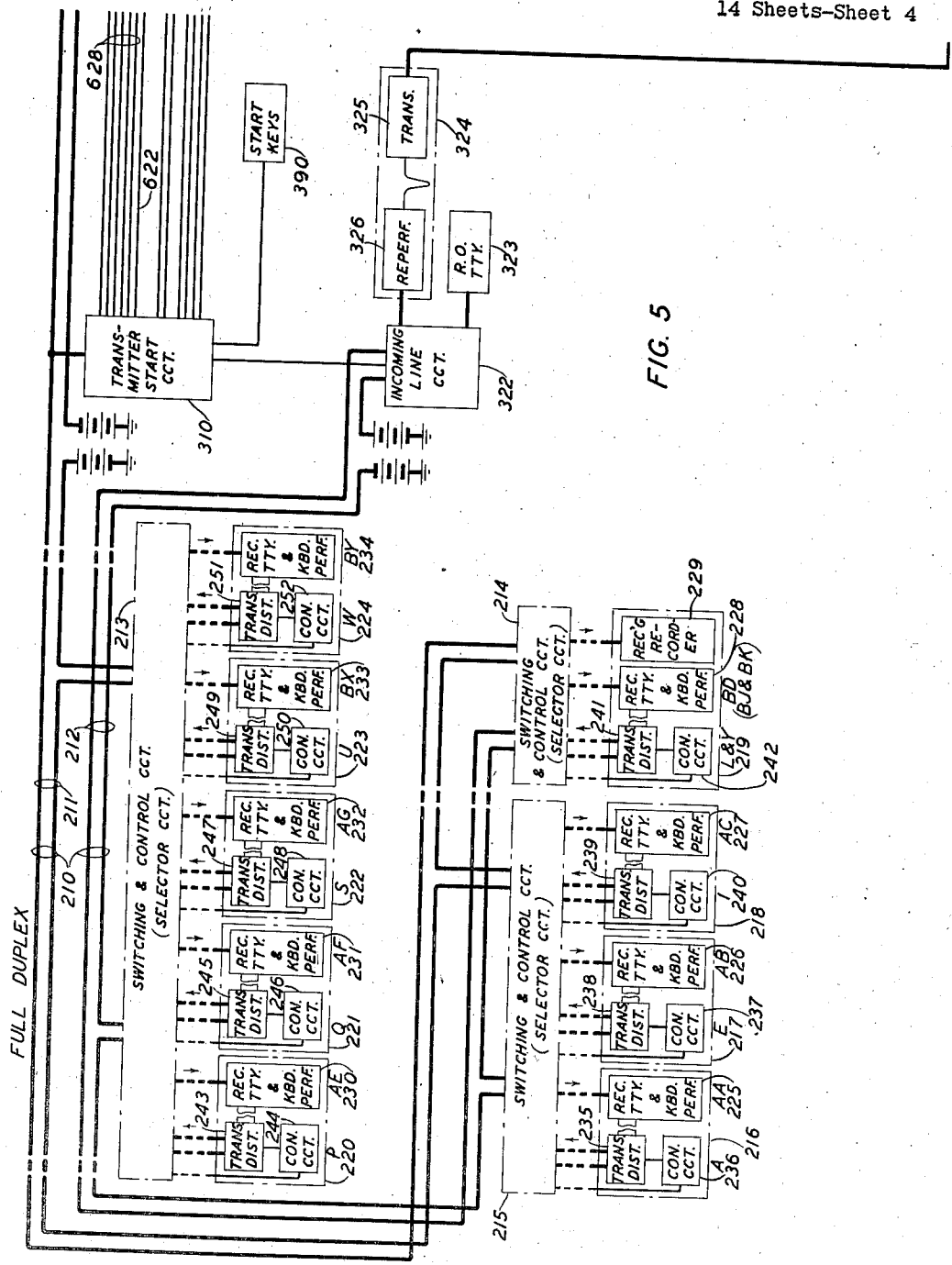
Figure 6:
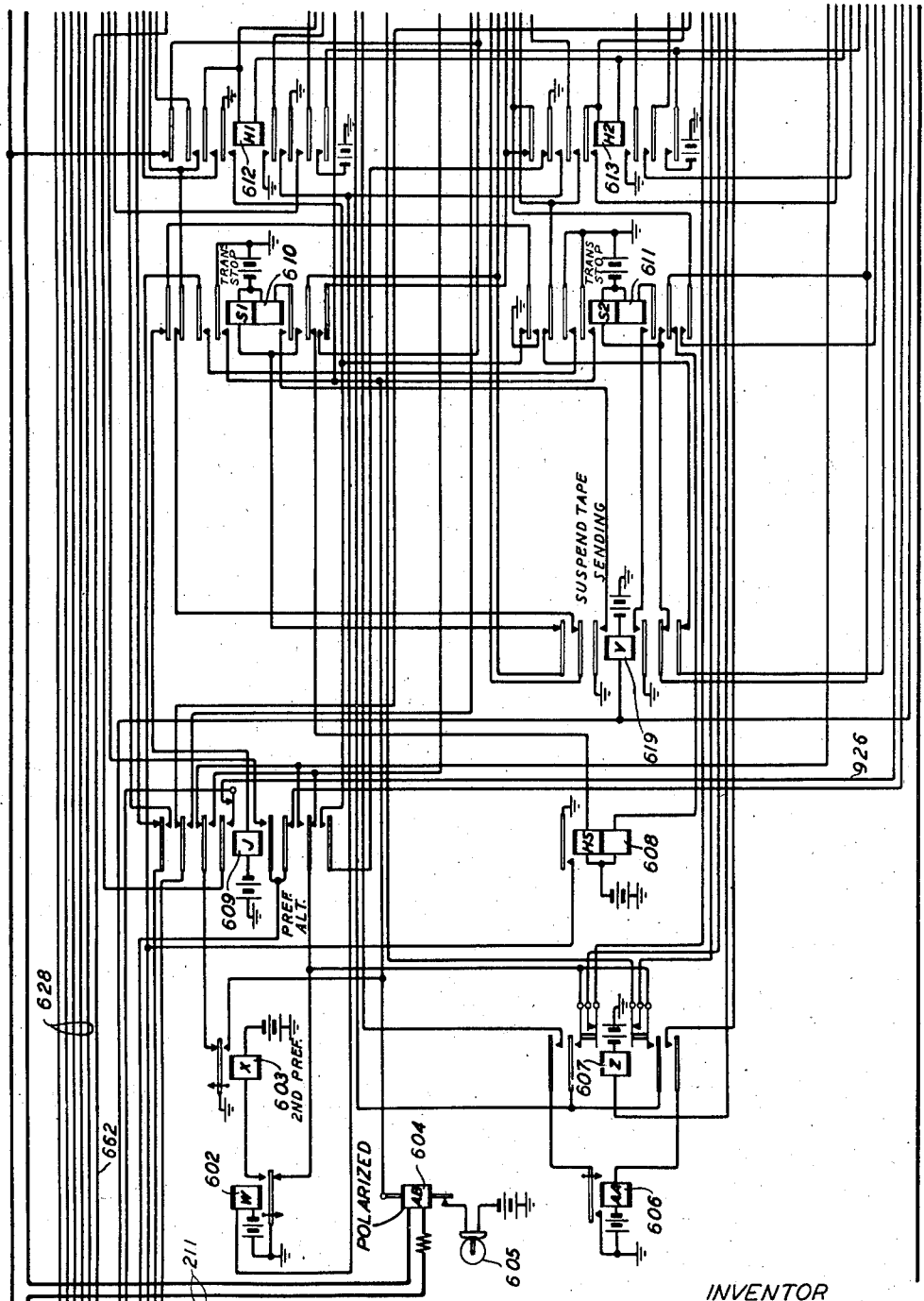
Figure 7:
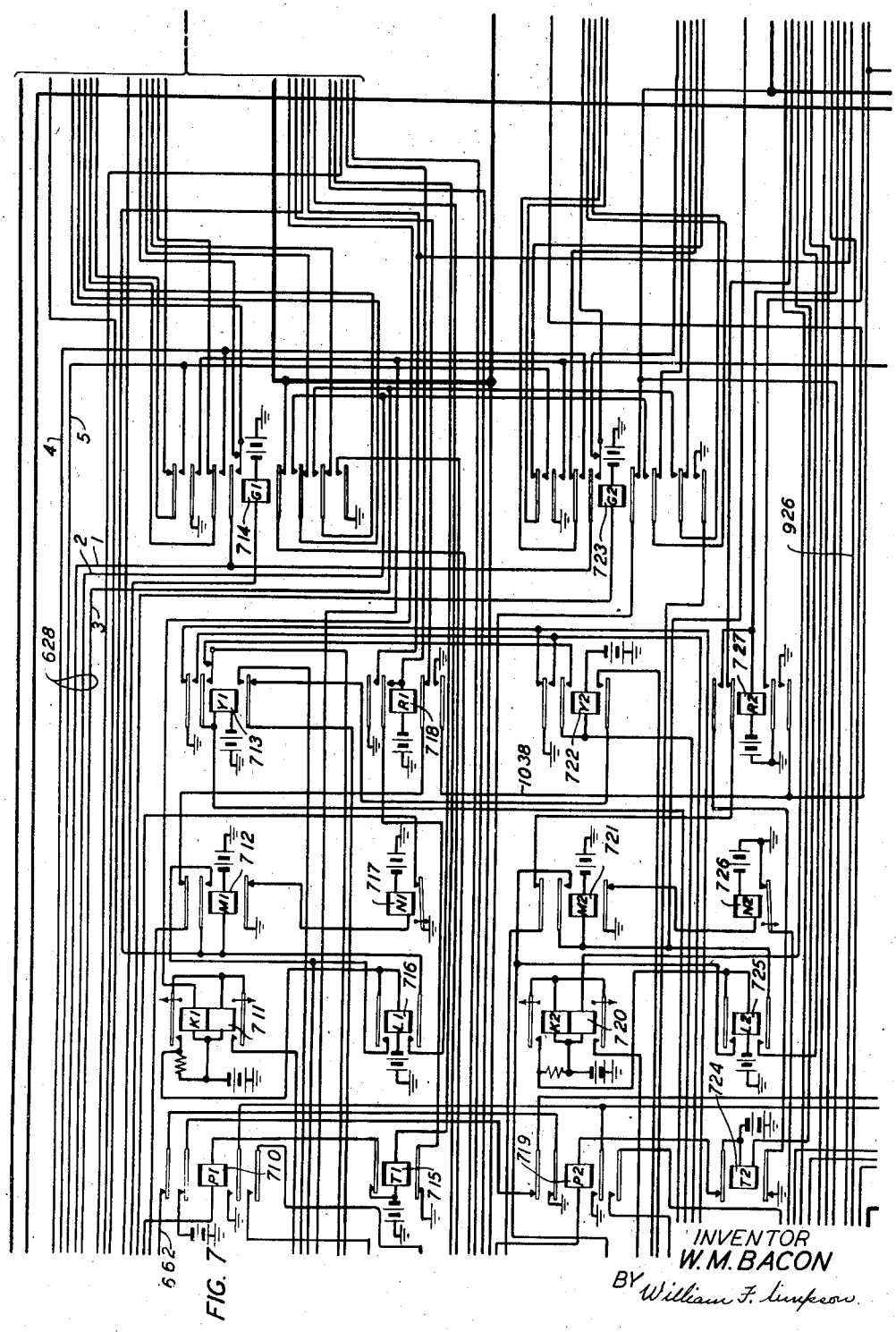

Reference will now be made to Figs. 5 through 15, inclusive, when arranged as shown in Fig. 1B. Fig. 5 shows the subscribers' stations and control equipment associated with party line 210. The subscribers' stations and control equipment associated with party line 210 are shown in substantially the same form as shown in Fig. 2. In addition, the same reference numerals have been employed to designate the stations and equipment. Details of typical party lines of this type are described in the above copending application of Branson et al., and also in a patent application of Krecek et al., Serial No. 408,604, filed August 28, 1941, Patent No. 2,366,733, dated Jan. 9, 1945, which applications are hereby made a part of this application as if fully included herein. Inasmuch as the equipment in the circuits at the subscribers' stations as well as the control circuits therefor operate in substantially the same manner as described in the above-identified copending applications, detailed description of the operation of the circuits will not be repeated here.

Fig. 5 also shows transmitter start circuit 310 as well as the incoming line circuit 322, storage repeater 324 comprising a reperforating unit 326 and a transmitting unit 325. Fig. 5 also shows a receiving only machine 323 associated with the incoming line circuit for receiving messages intended for the central switching center. As described above, incoming messages intended for the central switching center are directed to the receiving only machine 323, while messages intended for other stations of the system are recorded by the receiving instrument 326 of the storage instrument 324. The transmitting portion of the storage device 324 cooperates with the director circuit 1501 for selectively directing messages to the proper lines in accordance with the address codes preceding each of the messages. The operation of the director circuit in directing messages to the respective lines of the system under control of switching or directing characters preceding various messages or communications is substantially the same as described in the above-identified application of Branson et al. Consequently, the details of operation of this portion of the system will not be repeated here. It should be noted, however, that a single line is shown in the drawing extending from the transmitter 325 to the director circuit 1501. This single line shown in the drawing is intended to represent the operative connections between transmitter 325 and director 1501 and includes as many wires or conductors as are necessary to control the operation of the system in the manner set forth in the above-identified copending Branson et al. application.

Assume now for purposes of illustration that it is desired to expedite the transmission of messages directed to the receiving recorder or reperforator 229 at station 219. As indicated in the above-identified copending application of Branson et al., messages directed to the recording equipment 229 at station 219 are preceded by either the address code BJ or BK. Any suitable address code may be chosen to direct messages to this recording equipment, but for the purposes of illustration the code letters BJ and BK were assumed in the above-identified copending application and will be likewise assumed herein. As pointed out in the above-identified copending application, it is frequently desirable to retransmit messages recorded by the recorder 229 over other transmission systems. For this reason, it may be desirable to expedite the transmission of these messages relative to other messages transmitted over the system described herein. The messages re-originating at any of the stations of party line 210 or any of the other stations of the system directed to the recording equipment 229 will be transmitted to the central switching station in the same manner as the messages directed to other stations of the system. In transmitting these messages to the central switching station, the attendants at each of the outlying stations will perforate message signals preceded by the address codes in the tape by means of the keyboard perforator at the respective stations. The perforated tape is then inserted in the tape controlled transmitter where it awaits transmission to the central switching station.

Equipment at the central switching station either automatic or under control of the start keys 380, causes the start circuit 310 to transmit predetermined start signals or patterns of signals over the receiving channel 211 of party line 210 and causes the initiation of transmission selectively from the transmitters at the stations connected to the party line.

The messages are then transmitted over the transmitting channel such as 212 to the central switching station. The central station incoming line circuit together with the storage repeater 324 and receiving only device 323 cause the signals to be recorded either by the receiving only device 323 or by the storage repeater 324 by recording equipment 326 thereof or by both of these devices. Thereafter the transmitting portion 325 of the storage repeater 324 will, in cooperation with the director circuit 1501, cause the message to be transmitted to circuits associated with the proper party line extending to the stations designated by the address preceding each message or communication.

The manner of operation of the equipment as well as more detailed description of the equipment are set forth in the above-identified application of Branson et al. Since the equipment of the system described in this application operates in substantially the same manner as described in said application of Branson et al., the description thereof will not be again repeated.

In directing messages to the respective outgoing line circuit, the director equipment 1501 first tests the outgoing line circuit equipment to determine whether or not it is busy. If the outgoing line equipment is busy, the director equipment will wait until it becomes idle. If the equipment is idle or some channel thereof is idle, the director equipment will cause the message to be transmitted over the idle channel.

Figure 8:
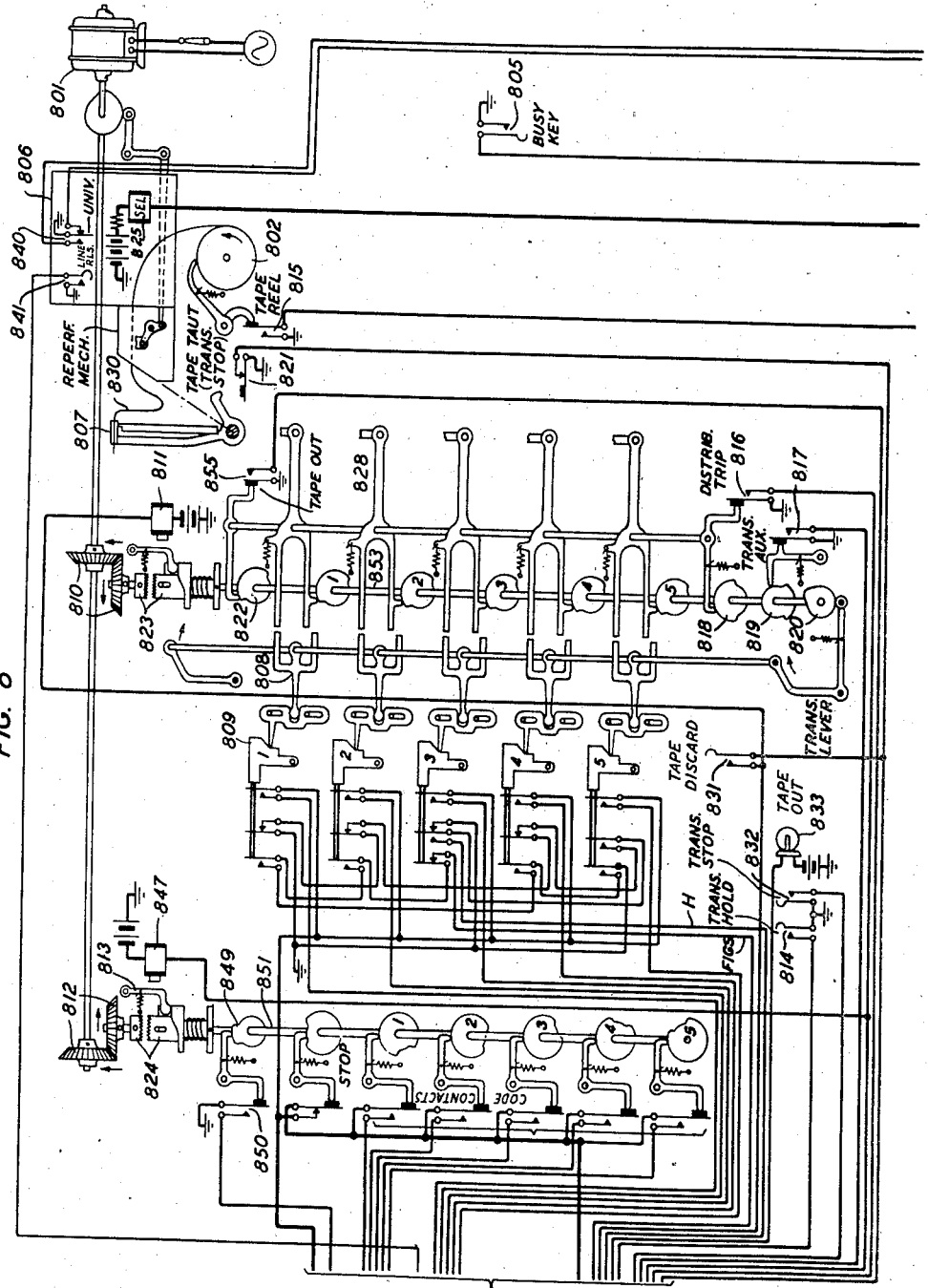
Figure 9:
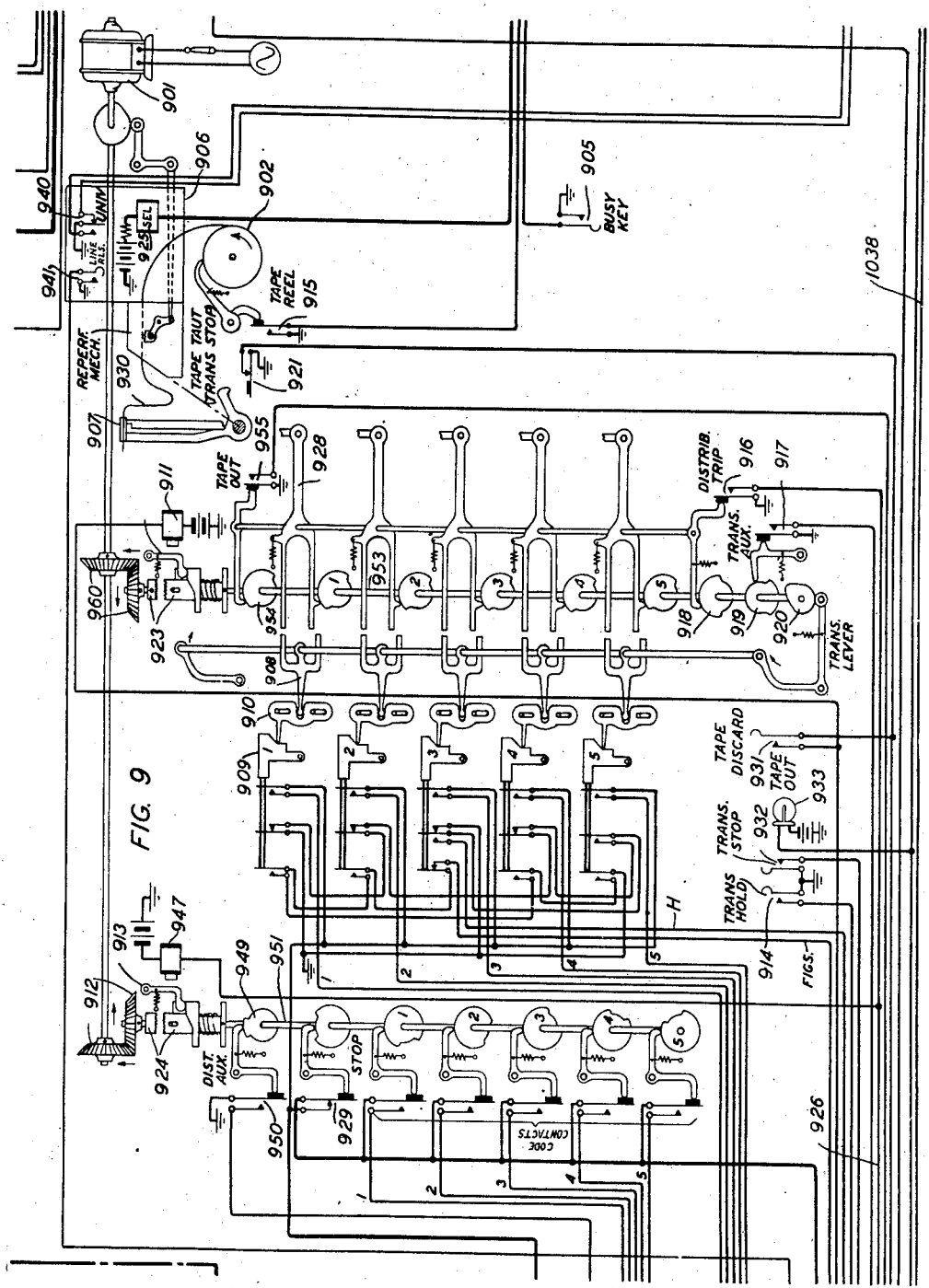
Figure 10:
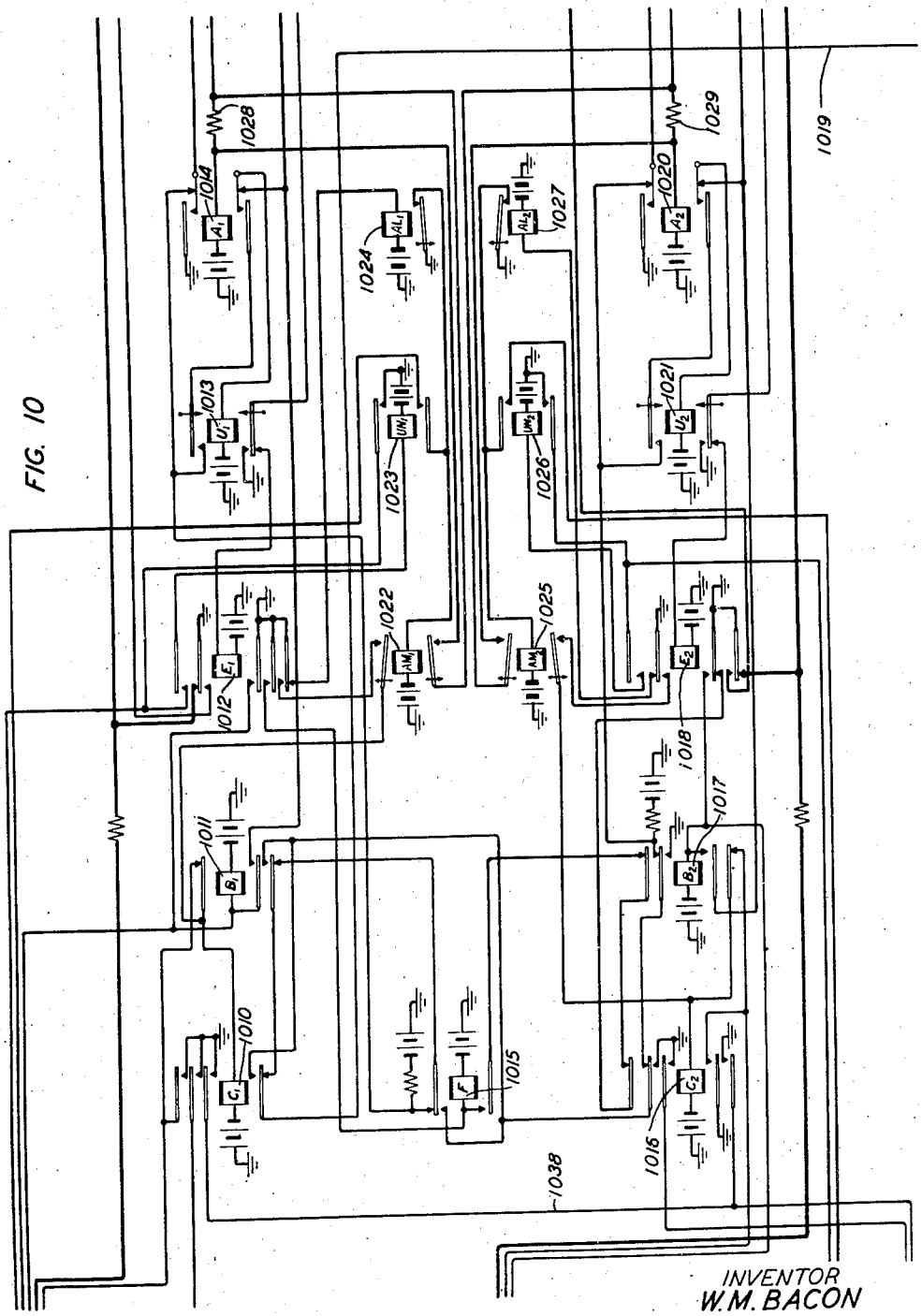
Figure 11:
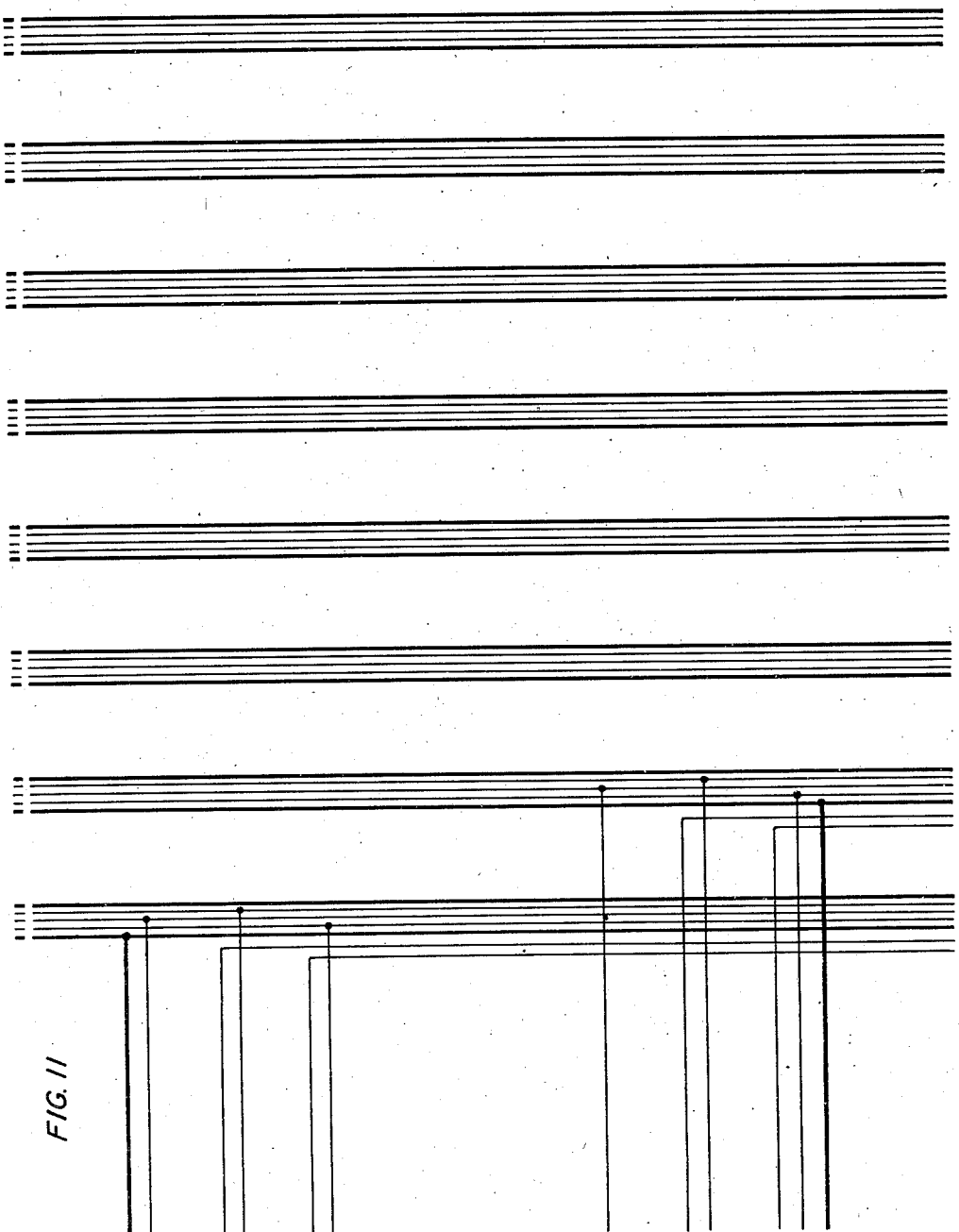
Figure 13:
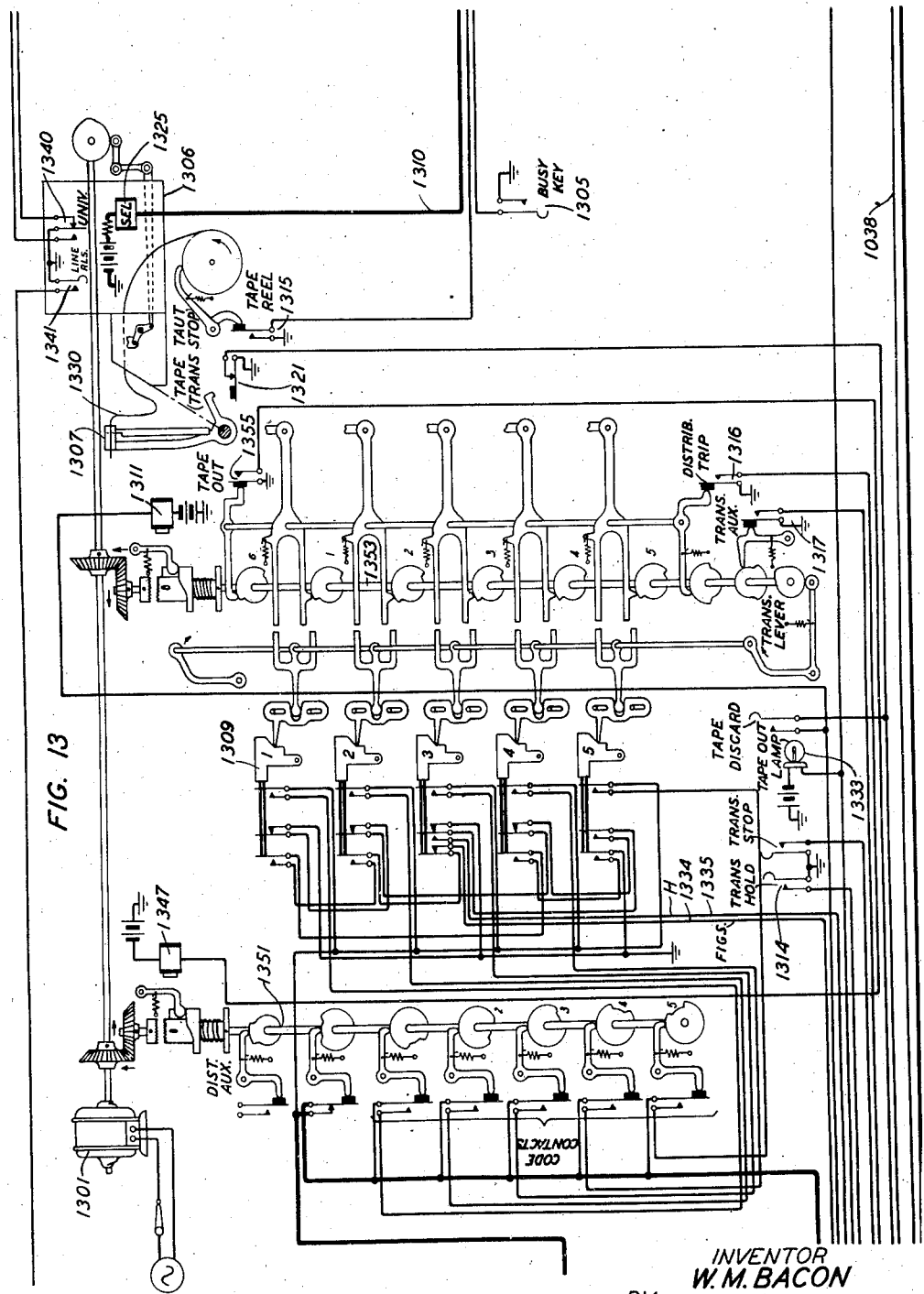
Figure 14:
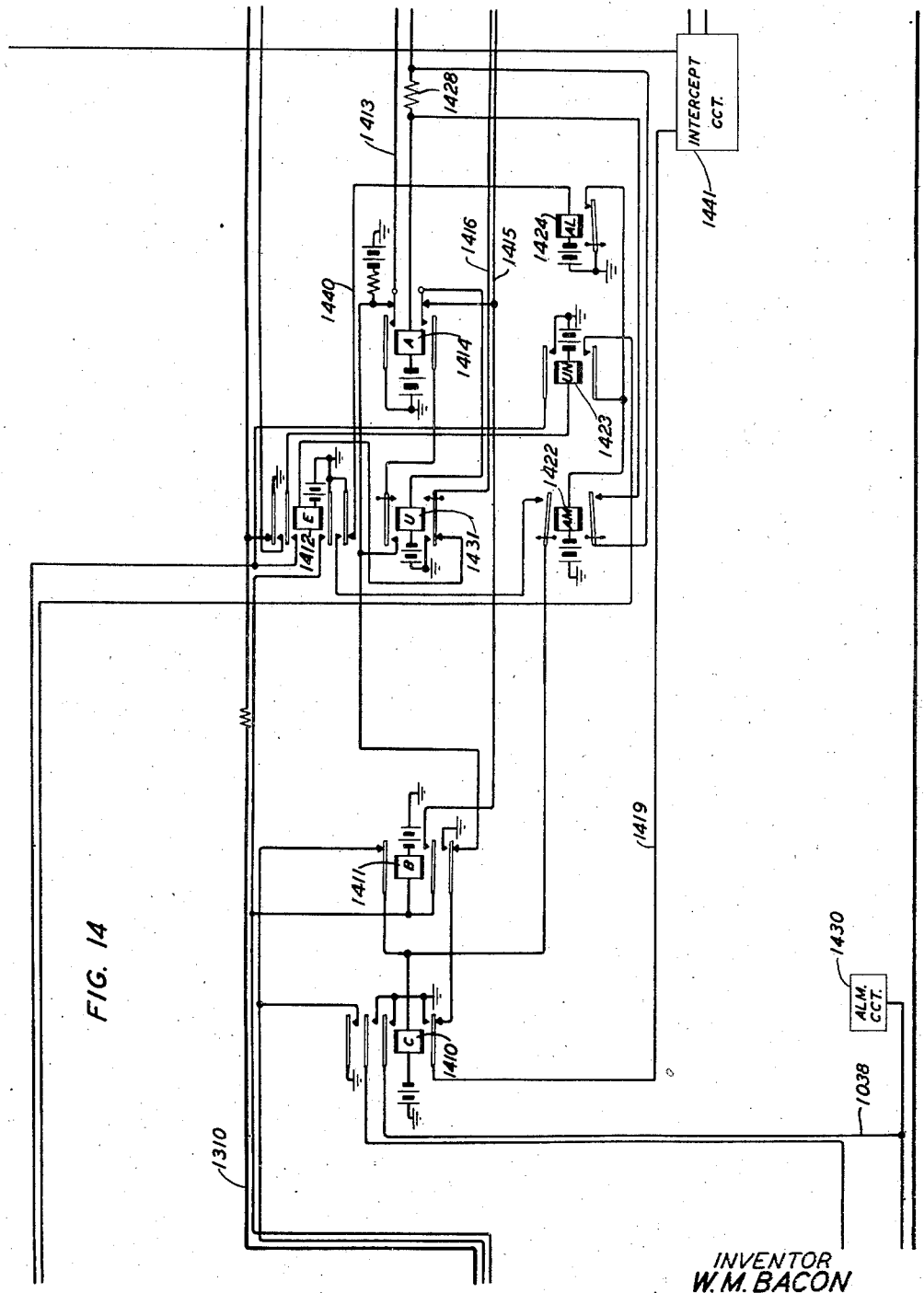
Figure 15:
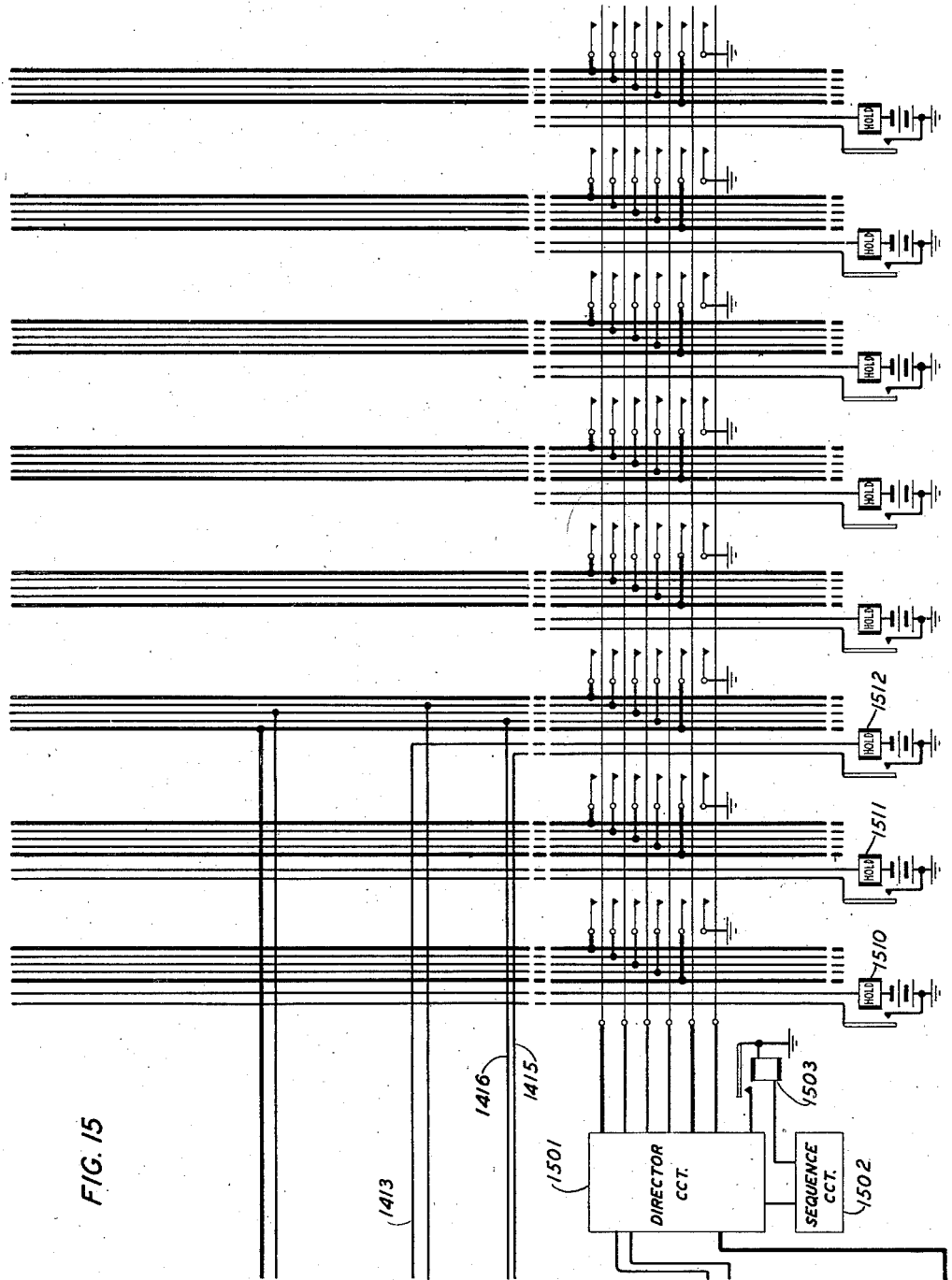

Under the assumed condition, messages preceded by the address codes BJ and BK are transmitted more expeditiously than other messages, messages preceded by these address codes will be directed to the storage repeating equipment shown in Fig. 13, whereas, other messages directed to other stations of the party line 210 will be directed to the storage equipment shown in either Figs. 8 or 9.

Consider first the messages directed to the storage repeater equipment shown in Fig. 13. When messages are preceded by the address codes, either BJ or BK, director equipment will first test the conductor 1419 extending through the intercept circuit 1441 to determine whether or not the receiving side of the storage repeater shown in Fig. 13 is busy. If this equipment is busy, nothing further will happen until the equipment becomes idle. At this time, the director circuit will cause ground to be connected to lead 1419 which lead extends through the lower break contacts of relays 1410, 1411 and the upper break contacts of relay 1414 over conductor 1413 to the vertical magnet 1512 of the cross bar switch diagrammatically illustrated in Fig. 15.

A typical switch is described in United States Patent 2,021,329, granted to Reynolds on November 19, 1935, which patent is hereby made a part of this application as if fully included herein.

The horizontal magnet 1503 of the cross bar switch was previously operated under control of the sequence circuit 1502 and director circuit 1501 in a manner similar to that described in the above-identified copending application of Branson et al. The operation of the vertical or hold magnet 1512 when magnet 1503 is also operated causes the contacts at the cross-point to be operated and also completes a circuit over lead 1415 for operating relay 1431 from battery through the winding of relay 1431, the lower break contacts of relay 1414 and lead 1415 to ground through the operated contacts of magnet 1512. Relay 1431 in operating connects ground to lead 1416 extending through the operated cross-point contacts of the cross bar switch to the director circuit 1501. The director circuit then completes a circuit for the operation of relay 1414. Relay 1414 in operating applies ground to lead 1413 for holding magnet 1512 operated. Relay 1414 in operating also transfers the circuit of relay 1431 to lead 1419 extending to the director circuit. When the director circuit removes ground from lead 1419, relay 1431 releases and prepares a circuit for the operation of relay 1412 from battery through the winding of relay 1412, lower break contacts of relay 1431, over lead 1416 to the director circuit. The director circuit together with the release of relay 1431 will cause relay 1412 to operate and condition the receiving portion of the storage repeater shown in Fig. 13 for operation. In addition, the operation of relay 1412 completes a circuit for the operation of relay 1411. Relay 1411 in turn operates and completes a circuit for maintaining itself operated over lead 1415. Relay 1411 in operating also causes the circuit to test busy should any other director circuit test this circuit preparatory to sending a message thereto.

The operation of relay 1412 connects ground to lead 1520 extending to the director circuit which in turn causes the message preceded by the second of the address code to be transmitted to and recorded by the recording portion of the storage repeater shown in Fig. 13. Under the assumed conditions, the message will at this stage of transmission be preceded by either a J or K designating the recording equipment 229 at station 219.

In a similar manner, messages preceded by other of the address codes designating other stations of the party line 210 will be directed to either the storage repeater equipment shown in Fig. 8 or that shown in Fig. 9 in a manner similar to that described above with reference to the directing of a message to the recording equipment shown in Fig. 13.

In addition the messages directed to the other stations of party line 210 will be directed alternatively to the storage repeater shown in Figs. 8 and 9 due to the operation of relay 1015 in the manner described in the above-identified copending application of Branson et al. forming a part of the present application. Various alarm and other indications are provided for indicating the condition of the system as described in the above-identified copending application, which description need not be repeated here.

The storage equipment shown in Figs. 8, 9 and 13 comprises recording instruments 806, 906 and 1306, respectively. These equipments are driven by their respective motors 801, 901 and 1301 and record messages under control of the respective selector magnets 825, 925 and 1325 and cause the message to be both printed upon and perforated or punched in respective tapes 830, 930 and 1330. When message material is stored by these receiving devices or storage devices, it will cause the respective transmitting heads 807, 907 and 1307 to rotate in a counterclockwise direction and thus cause the respective contacts 821, 921 and 1321 to close.

Assuming now for purposes of illustration that message material has been supplied to each of the storage repeaters shown in Figs. 8, 9 and 13, and that this message material is transmitted to these repeaters substantially simultaneously so that the contacts 821, 921 and 1321 are all closed substantially simultaneously. The closure of contacts 821 completes a circuit for the operation of relay 710 from battery through the upper break contacts relay 715, the winding of relay 710, the second set of normal contacts from the top of relays 610 and 619 to ground through the operated contact 821. Likewise closure contact 921 completes a circuit for the operation of relay 719 due to the current flowing through a similar circuit to ground through the closed contact 921. It is assumed that relays 619, 610 and 611 are all normal or released at this time. In other words, none of the stop keys associated with the transmitting portions of the storage repeaters shown in Figs. 8 and 9 have been operated and also that the transmitter start circuit 310 is not in the progress of transmitting a series of start signals or patterns, or starting transmission from any of the stations of the party line.

If the transmitter start circuit is in the progress of transmitting signals to cause the testing of any of the transmitters for storage message material available for transmission, relay 619 will be operated, which relay interrupts the operating circuit of relays 710 and 719. These relays will not, therefore, operate at this time but will wait until relay 709 is released at the end of the transmisison of the transmitter start circuit by the transmitter start circuit 310.

If either of the stop keys has been operated, either relay 610 or 611 will be operated and will prevent the operation of the corresponding relay 710 or 719. Assuming, however, that both relays 710 and 719 operate at this time, the operation of relay 710 completes the circuit for the operation of relay 713 from battery through the winding of relay 713, through the lower inner break contacts of relay 607, the lower outer operated contacts of relay 710, to ground through the second set of normal contacts from the bottom of relay 609 and the break contacts of relay 602.

The operation of relay 719 completes a similar circuit for the operation of relay 722 from battery through the winding of relay 722, the upper inner break contacts of relay 607, the lower outer operated contacts of relay 719, to ground through the third set of normal contacts from the top of relay 609 and the break contacts of relay 603. The operation of either or both relays 713 and 722 completes a circuit for the operation of relay 607 from battery through the winding of relay 607 to ground, through the upper outer operated contacts of either or both relays 713 and 722. Relay 607 in operating interrupts the operating circuits of relays 713 and 722. However, the operation of relay 607 first completes a circuit for maintaining relay 713 operated from battery through the winding and the upper operated contacts of relay 713, the second set of operated contacts from the top and bottom of relay 607 to ground through the break contacts of relay 602.

Inasmuch as both relays 713 and 722 have been operated, relay 713 will lock operated while relay 722 will release due to the fact that both its operating circuit and locking circuit are interrupted. The operating circuit of relay 722 is interrupted by the operation of relay 607 and its locking circuit is interrupted by the operation of relay 713.

The release of relay 722 completes the circuit for the operation of relay 606 which relay in operating prepares a circuit for the operation of relay 612.

Similarly, the operation of relay 1204 in response to the operation of contacts 1321 prepares a circuit for the operation of relay 1201. Relays 1201 and 612, however, do not both operate at this time.

The operation of relays 710, 719 and 1204 also connects ground to the right-hand winding terminal of relay 1214. With, however, relays 612, 613, 1201 and 1202 released, the left-hand winding terminal of relay 1214 will be open at contacts of these relays.

Figure 12:
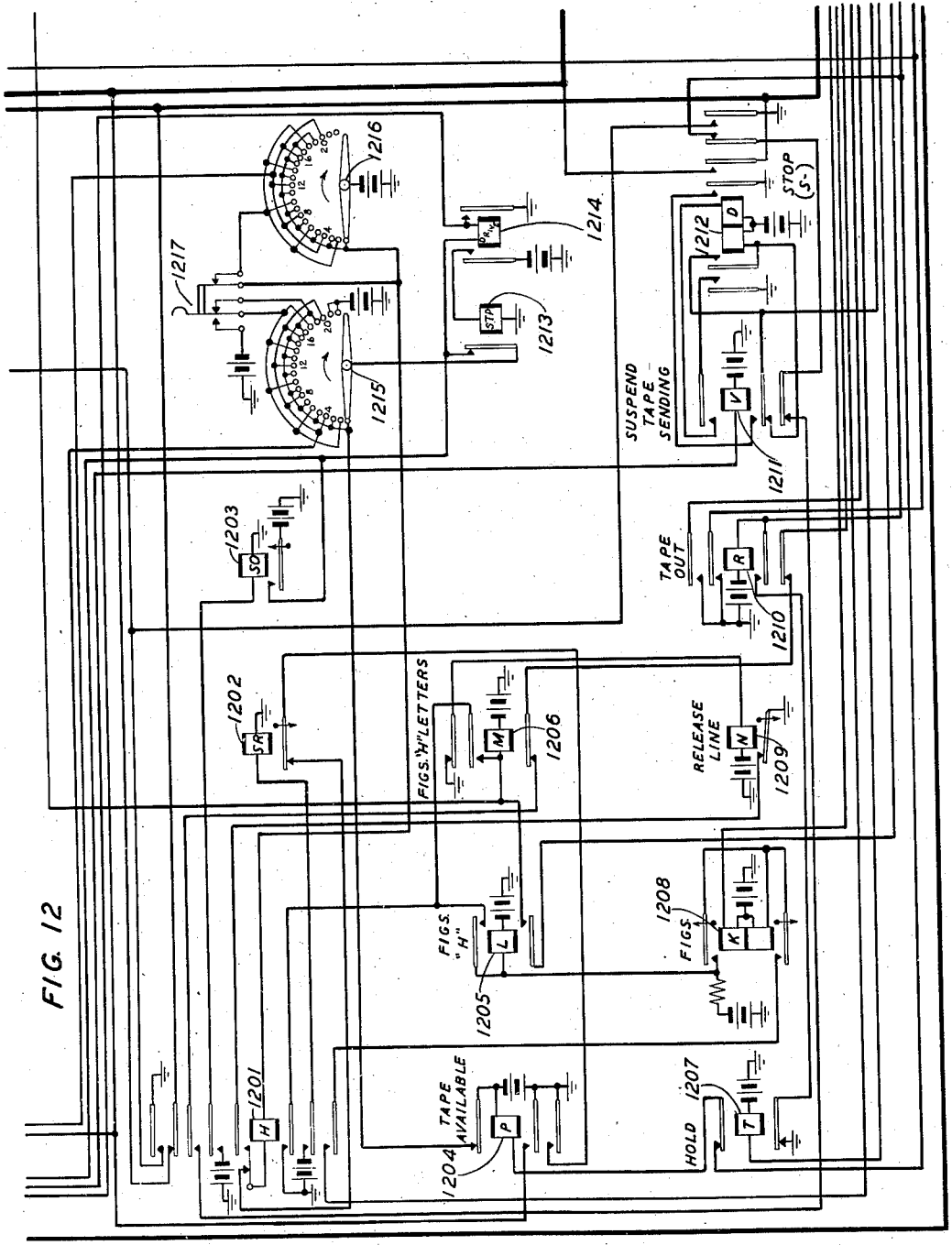

Under these circumstances the terminal upon which the brush arm 1216 of the stepping switch is resting will determine which one of the relays 1201 or 612 operates. As shown in Fig. 12 and with the brush arm 1216 resting upon the first terminal, relay 1204 operated, a circuit will be completed for the operation of relay 1201 extending from battery through brush arm 1216, the first terminal of the associated bank, the winding and the upper inner break contacts of relay 1201, the lower break contacts of relay 1202 to ground through the lower operated contacts of relay 1204. The operation of relay 1201 completes a circuit for the operation of relay 1203 which relay is slow in operating, but after a short interval of time operates.

The operation of relay 1203 completes a circuit for the operation of relay 1214 from battery through the operated contacts of relay 1203 and the winding of relay 1214 to ground through the lower inner operated contacts of relay 1204. Relay 1214 in operating completes an obvious circuit for operating the stepping magnet 1213 of the selector switch. Brush arms 1215 and 1216, however, do not operate upon the energization of magnet 1213. These brush arms instead advance upon the release of magnet 1213 as will be described hereinafter. Relay 1214 and magnet 1213 remain energized as long as relays 1201 and 1204 remain operated.

The operation of relay 1201 in addition completes an obvious circuit for the operation of relay 1202. The operation of relay 1202 interrupts the operating circuit of relay 1201. However, prior to the operation of relay 1202, relay 1201 completes a circuit for maintaining itself operated under control of relay 1209 from ground through the lower operated contacts of relay 1209, the upper inner operated contacts and winding of relay 1201 to battery through the bank terminal and brush arm 1216. The operation of relay 1201 also removes a shunt or short circuit from around the cam controlled code contacts of the transmitting portion of the storage repeater shown in Fig. 13.

The operation of relay 1201 also completes a circuit for the operation of the release magnet 1311 from battery through the winding of magnet 1311, the lower break contacts of relays 1210 and 1206, the second set of operated contacts from the top of relay 1201, the lower outer break contacts of relay 1211, right-hand break contacts of relay 1212 to ground through the closed contacts 1321.

Magnet 1311 in operating releases cam shaft 1353 which controls the tape sensing equipment and transfer apparatus for sensing the codes stored in tape 1330 and causing them to be transferred to members 1309 which members in turn position the contacts controlling the circuits extending through the distributor contacts. During the revolution of the cam shaft 1353, and after members 1309 have been positioned in accordance with the code combination, contacts 1316 close and complete an obvious circuit for the operation of the distributor start magnet 1347. The operation of this magnet will release the distributor cam shaft 1351 and cause a code combination to be transmitted over the receiving channel 211 and party line 210. Thereafter, the above cycle of operation of the transmitting portion of the storage repeater shown in Fig. 13 will be repeated and succeeding characters or code combinations stored in tape 1330 will be transmitted over the receiving channel 211 of the party line 210.

Under the assumed conditions, the first code combination will be either the letter J or the letter K which will cause the switching equipment 214 to direct a message to the reperforating equipment 229 at station 219. It should be noted that messages directed to this equipment are transmitted even though other messages are awaiting for transmission to other stations or recording equipment on line 210 from the storage repeaters shown in Figs. 8 and 9.

Members 1309 in addition to controlling contacts which cause the transmission of signals in accordance with stored code combinations also control additional contacts which contacts complete circuits in response to the figures code combination and the letter H of the code combination. It will be obvious to those skilled in the art that these additional contacts may be arranged so that they may complete circuits in response to the setting of members 1309 in accordance with any desired predetermined code combination. The code combinations representing figures and H employed herein by way of typical examples are suitable for controlling the respective circuits. The same code combinations were assumed by way of example in the above-identified application of Branson et al. It is, however, to be understood that any other suitable code combination may be employed.

Each time a figures code combination is transmitted over the receiving channel 211, a circuit is completed from ground through the contacts controlled by members 1309 and over conductor 1334 to battery through the upper winding of relay 1208. Relay 1208 operates due to current flowing through its upper winding in this circuit and prepares a circuit for the operation of relay 1205. If the succeeding code combination is any code combination other than the code combination usually representing figures or the letter H, relay 1208 will release when members 1309 are positioned in accordance with this succeeding code combination. The release of relay 1208 at this time will restore the circuits to their previous condition and the transmission of the signals stored in tape 1330 will continue.

As indicated above, at the end of the message or communication, the subscriber will append to the message a disconnect or end of message signal or pattern which has been assumed by way of example to comprise a figures signal followed by an H signal and these two signals in turn followed by a letters signal or code combination.

When the figures signal is sensed by the transmitting head 1307 and members 1309 positioned in accordance with it, the above-described circuit for operating relay 1208 will be completed and relay 1208 operated as described above. The following signal under the assumed condition will then be the letter H signal. When the members 1309 are positioned in acordance with the H signal following the figures signal, a circuit will be completed from ground through contacts controlled by members 1309 over conductor 1335, the lower operated contacts of relays 1201 and 1208 through the lower winding of relay 1208 to battery and also through the upper operated contacts of relay 1208 to battery through the winding of relay 1205. Relay 1208 is somewhat slow in releasing so that it will remain operated during the transition between the setting of members 1309 in accordance with the figures signal and the H signal. When the members 1309 are positioned in accordance with the H signal, the above-described circuits through the lower winding of relay 1208 maintain this relay operated and in addition cause relay 1205 to operate.

The operation of relay 1205 completes a circuit for maintaining itself and relay 1208 operated under control of relay 1201 from battery through the lower winding and the upper operated contacts of relay 1208, and also from battery through the winding and upper operated contacts of relay 1205 to ground through the lower inner operated contacts of relay 1201. Both the figures code combination and the following H code combination are transmitted over the receiving channel 211 in the normal manner.

Shortly after the beginning of the revolution of the cam shaft controlling the mechanism during which the succeeding letters signal is scanned or sensed, contacts 1317 will be closed and complete a circuit for the operation of relay 1206 from battery through the winding of relay 1206, the lower operated contacts of relay 1205 to ground through the contacts 1317.

The operation of relay 1206 interrupts the operating circuit of the release magnet 1311 and thus permits this magnet to release and stop the operation of the transfer shaft 1353 and mechanism controlled thereby at the end of the revolution during which the letter signal is sensed.

The operation of relay 1206, in addition, interrupts the operating circuit of the slow release relay 1209. Relay 1209, however, does not immediately release due to its slow releasing characteristic. The released time of relay 1209 is determined so that the letters signal will be fully transmitted over the receiving channel 211 of the party line 210 before relay 1209 releases. The release of relay 1209 at the end of its delay period interrupts the locking circuit of relay 1201 and permits this relay to release. The release of relay 1201 in turn interrupts the locking circuits of relays 1205 and 1206 and 1208 and permits relays 1205 and 1206 and 1208 to release.

The release of relay 1201 also short-circuits the transmitting contacts of the transmitting distributor shown in Fig. 13, thus maintaining the transmitting channel 211 closed. The release of relay 1201 also interrupts the operating circuit of relay 1203 which relay in turn interrupts the operating circuit of relay 1214 and permits relay 1214 to release, which relay in turn permits the stepping magnet 1213 to release and advance the switch arms 1215 and 1216 one step. The release of relay 1201 also interrupts the operating circuit of relay 1202. Relay 1202 is a slow release relay and does not release until after ample time has been provided for the stepping of brush arms 1215 and 1216 to the next set of terminals.

For purposes of illustration, assume now that a second message is awaiting transmission from the storage repeater shown in Fig. 13. Under these circumstances contacts 1321 remain closed and maintain relay 1204 operated. When relay 1202 releases under these conditions, the above-described circuit for operating relay 1201 will be completed. In this case, however, the circuit extends through the second contact of the bank and brush arm 1216 of the stepping switch and the normal right-hand break contacts of key 1217.

If an additional message is not awaiting transmission from the storage device shown in Fig. 13, the circuits will operate as described hereinafter.

Thereafter, circuits of Fig. 12 will operate in substantially the same manner as described above to cause the succeeding message stored in tape 1330 to be transmitted. This message may be preceded by either J or K as assumed above and under these conditions will cause the message to be directed to the recording equipment 229 at station 219 in the same manner as described above.

At the end of the second message the disconnect pattern comprising a figures signal followed by an H signal and then a letters signal will be scanned by the transmitting portion of the storage repeater in the manner described above and these signals transmitted over the receiving channel 211 where they cause the receiving equipment, such as equipment 229, under the assumed circumstances, to be disconnected from the receiving channel and the switching and control equipments 213, 214, and 215 to be positioned for connecting one of the receiving devices of the party line to the receiving channel in response to the directing or address signals preceding the next message transmitted over the receiving channel.

As before, the figures signal when scanned by the transmitting equipment causes members 1309 to be positioned in accordance therewith and these members in turn, when so positioned, complete a circuit for the operation of relay 1208. The succeeding H signal will complete a circuit for the operation of relay 1205 as described above. The succeeding signal, which under the assumed condition will be a letters signal, will cause the operation of relay 1206. Relay 1206 in operating interrupts the circuit of magnet 1311 and permits this magnet to release and interrupt the transmission from the storage equipment shown in Fig. 13. The operation of relay 1206 also interrupts the operating circuit of relay 1209. Relay 1209 then releases after the letters signal has been completely transmitted over the receiving channel of the party line 210. The release of relay 1209, as before, interrupts the locking circuit of relay 1201 which permits this relay to release and short-circuit the transmitting contacts of the storage repeater shown in Fig. 13.

Assuming now that no additional messages are awaiting transmission from the transmitting repeater equipment shown in Fig. 13 when the final letters signal is scanned by this equipment, the transmitting head 1307 will have moved in a clockwise direction so that it is against the perforating equipment. At this time, the contacts 1321 will interrupt the circuit of relay 1204 thus indicating that no further messages are available for transmission from storage repeater equipment shown in Fig. 13.

The release of relay 1201 after the release of relay 1209 interrupts the operating circuit of relay 1203. Relay 1203 in turn releases and interrupts the operating circuit of relay 1214 which relay releases and interrupts the circuit of magnet 1213. Magnet 1213 releases and causes the brush arms 1215 and 1216 to advance to their third position where they are in contact with the third terminal of their respective banks. Under the conditions assumed above with relay 1204 released at this time, a circuit will be completed upon the release of magnet 1213 and the advance of brush arm 1215 to its third position for the operation of relay 1214 from battery through the upper break contacts of relay 1204, the third bank terminal and brush arm 1215, break contacts of magnet 1213, winding of relay 1214 to ground through the lower inner operated contacts of either or both relays 710 and 719.

It will be recalled that it was previously assumed that messages were awaiting transmission from both the storage repeaters shown in Figs. 8 and 9 so relays 710 and 719 are operated at this time. Relay 1214 in operating completes an obvious circuit for the operation of the stepping magnet 1213 which operates and interrupts the operating circuit of relay 1214 which relay releases and in turn interrupts the circuit of magnet 1213 which magnet releases and advances the brush arms 1215 and 1216 to their number four position.

If a third message had been awaiting transmission from the storage repeater shown in Fig. 13, the circuits would operate as described above to cause the transmission of this message at the end of which brush arms 1215 and 1216 return to their number four position.

When brush arm 1216 advances to its number four position in either manner, a circuit will then be completed for the operation of relay 612 from battery through the brush 1216 and the number four bank terminal through the winding of relay 612, the lower operated contacts of relay 713, the upper operated contacts of relays 607 and 606 to ground.

Relay 612 in operating completes a circuit for the operation of relay 1214 from battery through the lower outer operated contacts of relay 612, the winding of relay 1214, to ground through the lower operated contacts of relay 710. The operation of relay 1214 at this time completes an obvious circuit for the operation of the stepping magnet 1213 which magnet operates and remains operated during the transmission of a message from the storage repeater equipment shown in Fig. 8.

The operation of relay 612 also completes a circuit for the operation of relay 609 from battery through the winding of relay 609, the upper outer break contacts of relays 610 and 611 to ground through the upper inner operated contacts of relay 612. Relay 609 in operating completes a circuit for maintaining itself operated from battery through the upper outer break contacts of relay 610 and 612, the lower outer operated contacts of relay 609 to ground through the second set of contacts from the top of relay 613. The operation of relay 609 transfers various circuits from the transmitter start circuit to the storage repeater equipment shown in Fig. 8, and in addition transfers control circuits so that the next time a message is transmitted from either of the storage repeaters shown in Figs. 8 or 9, the message will be transmitted from equipment shown in Fig. 9 providing, of course, messages are awaiting transmission as assumed above.

Relay 612 in operating completes a circuit for maintaining itself operated under control of relay 717 from ground through the lower operated contacts of relay 717, the third set of operated contacts from the top and winding of relay 612 to battery through the fourth bank terminal and brush arm 1216.

Relay 612 in operating completes a circuit for the operation of relay 602 from battery through the winding of relay 602 to ground through the third set of operated contacts from the bottom of relay 612. Relay 602 in operating completes an obvious circuit for the operation of relay 603. The operation of relay 602 interrupts the locking circuit of relay 713. The release of relay 713 interrupts the operating circuit of relay 607 and which relay in turn causes the release of relay 606.

The operation of relay 612 also removes the short-circuit from around the code contacts of the transmitting distributor of the equipment shown in Fig. 8 thus conditioning this equipment for transmission over the receiving channel of party line 210.

The operation of relay 612 also completes a circuit for the operation of the transfer shaft release magnet 811 from battery through the winding of magnet 811, the lower break contact of relay 718, the upper break contacts of relay 712, the second set operate contacts from the top of relay 612, the second set of break contacts from the top of relays 610 and 619 to ground through the closed contacts 821.

The operation of magnet 811 releases the clutch members 823 and allows cam shaft 853 of the transfer mechanism to rotate. Near the beginning of the revolution of this cam shaft, the sensing members 828 are released and sense the tape for the stored code combination. A short interval of time later transfer members 808 are positioned in accordance with the code combination sensed and cause members 809 to be likewise positioned in accordance with this code combination. Members 809 position the contacts controlled by them in accordance with the code combination. At a still later interval of time, contacts 816 are momentarily operated and complete a circuit for operating the transmitting distributor release magnet 847 which magnet operates and permits the shaft 851 to rotate. During the revolution of shaft 851 signals are transmitted over party line 210 in accordance with the code combination stored in tape 830. The above cycle of operation is then repeated and the message stored in tape 830 is transmitted over the receiving channel of party line 210.

As before, the first signal transmitted over the party line will be an address signal which will cause the control circuits and apparatus indicated by the boxes 213, 214 and 215 to connect the proper receiving equipment to the receiving channel 211 of the party line 210 so that the succeeding message signals will be recorded at the proper station as determined by the address code preceding the message as originally transmitted.

During the transmission of figures signals forming part of the message, relay 711 operates. If the succeeding signal is not an H signal, relay 711 will release immediately after the transmission of the figures signal.

The controlling circuits do not respond to the transmission of H signals which are not preceded by figures signals.

Assuming now that a figures signal is immediately followed by an H signal and a letters signal thus forming a disconnect or end of message pattern transmitted at the end of each message or communication. During the transmission of the figures signal a circuit is completed from ground through the contacts controlled by members 809 to battery through the upper winding of relay 711.

The operation of relay 711 will prepare a circuit for the operation of relay 716. During the transmission of the succeeding H signal, relay 716 is operated and relay 711 maintained operated in a circuit extending from ground through the contacts controlled by members 809, the H lead, the second set of operated contacts from the bottom of relay 612, the lower operated contacts of relay 711 to battery through the lower winding of relay 711 and through the upper operated contacts of relay 711 to battery through the winding of relay 716. Relay 716 in operating completes a circuit for maintaining itself and relay 711 operated under the control of relay 612. During the transmission of the letters signal following the H signal, contacts 817 close and complete a circuit for the operation of relay 712 extending from battery through the winding of relay 712 and the lower operated contacts of relay 716 to ground through the operated contacts 817. The operation of relay 712 interrupts the operating circuit of magnet 811 and thus stops the operation of the transmitting equipment shown in Fig. 8 at the end of the transmission of the letters signal. The operation of relay 712 also completes a circuit for maintaining itself operated under control of relay 612. Relay 712 in operating also interrupts the operating circuit of the slow release relay 717. Relay 717 is a slow release relay and does not release until after the letters signal has been fully transmitted over the party line 210.

The control apparatus of the party line 210 in response to the disconnect pattern causes the previously connected receiving equipment to be disconnected from the line and conditions the control equipment for connecting the same or other of the receiving equipment to the line in response to the address codes preceding the next message.

After the letters signal has been transmitted over the party line 210, relay 717 releases and interrupts the locking circuit of relay 612, thus permitting this relay to release.

The release of relay 612 short-circuits the transmitting contacts of the storage repeater shown in Fig. 8. The release of relay 612 also interrupts the operating circuit of relay 602 and thus permits relay 602 to release. Relay 602 is slow in releasing and does not immediately release thus providing ample time for other circuits to fully function and for various relays to fully release. The release of relay 602 interrupts the operating circuit of relay 603. Relay 603, however, does not immediately release because it is a delayed action relay. During the release time of relay 603, relay 602 will complete a circuit for the operation of relay 722 under the assumed conditions with a message awaiting transmission from the storage repeater shown in Fig. 9. The circuit for the operation of relay 722 may be traced from battery through the winding of relay 722, the upper inner break contacts of relay 607, the lower operated contacts of relay 719, through the second set of operated contacts from the bottom of relay 609 to ground through the break contacts of relay 602. The operation of relay 722 completes a circuit for the operation of relay 607 from battery through the winding of relay 607 to ground through the upper outer operated contacts of relay 722. The operation of relay 607 completes a circuit for maintaining relay 722 operated from battery through the winding and upper inner operated contacts of relay 722, the upper inner break contacts of relay 713, the inner operated contacts of relay 607 to ground through the break contacts of relay 602.

The operation of relay 607 also interrupts the operating circuit of both relays 713 and 722, thus preventing the operation of relay 713. However, the locking circuit for relay 722 is completed prior to the interruption of the operating circuit of this relay so relay 722 is maintained operated at this time.

The operation of relays 722 and 607 as described above is completed before relay 603 releases. Consequently, upon the release of relay 603 the operating circuit for relay 713 is not reestablished.

If no message had been awaiting transmission from the storage equipment shown in Fig. 9 and the message had been awaiting transmission from the storage apparatus shown in Fig. 8, relay 713 will be reoperated upon the release of relay 603. The operation under these circumstances in similar to that described in the above-identified patent application to Branson et al.

The operation of relay 607 as described above completes a circuit for the operation of relay 606 from battery through the winding of relay 606 and the lower outer operated contacts of relay 607 to ground through the upper outer break contacts of relay 713. Thereafter these circuits remain substantially in this position until other circuits function as described hereinafter.

During the release time of relay 602, the stepping switch is caused to take an additional step in the following manner. Upon the release of relay 612 the circuit of relay 1214 is interrupted and this relay releases. The release of relay 1214 interrupts the operating circuit of a stepping magnet 1213, thus permitting this magnet to release and advance its brush arms 1215 and 1216 one step. With brush arms 1216 and 1215 in the No. 5 position the circuits to relays 612 and 613 are interrupted and a circuit extended from battery through brush arm 1216 to the winding of relay 1201. If a message is awaiting transmission from the storage equipment shown in Fig. 13, it will be transmitted at this time in a manner similar to that described above. If, however, no message is awaiting transmission from the storage equipment shown in Fig. 13, relay 1204 will be released. Assume now that no messages are awaiting transmission from the storage equipment shown in Fig. 13 and that 1204 is released. With relay 1204 released and brush arm 1215 in the No. 5 position, a circuit will be completed for the operation of relay 1214 from ground through the lower inner operated contacts of relay 719 through the winding of relay 1214, break contacts of stepping magnet 1213, brush arm 1215 to battery throught the upper break contacts of relay 1204.

Relay 1214 in operating completes a circuit for the operation of stepping magnet 1213 which magnet in turn in operating interrupts a circuit of relay 1214, thus permitting this relay to release and releases the stepping magnet 1213. Magnet 1213 in releasing causes the brush arms 1215 and 1216 to advance one step and again completes a circuit of relay 1214 which relay will again cause the switch to take another step. This operation is repeated until the brush arms 1215 and 1216 rest on the No. 8 terminals of their respective banks whereupon a circuit is completed for the operation of relay 613. The operation of relay 613 causes the transmission of messages stored in the storage equipment shown in Fig. 9 in a manner similar to the manner in which the operation of relay 612 causes the transmission of messages stored in the storage equipment shown in Fig. 8.

In this case, however, the operation of relay 613 interrupts the locking circuit of relay 609 and thus permits relay 609 to release. At the end of the message transmitted in the storage equipment shown in Fig. 9 the disconnect or end of message signal pattern will cause the circuits to be restored to their idle condition and if another message is awaiting transmission on any one of the storage units shown in Fig. 8, 9, or 13, the stepping switch shown in Fig. 12 will be advanced so as to permit the transmission of messages from any of these units.

By suitably connecting the bank terminals associated with brushes 1215 and 1216, it is possible to give the storage equipment shown in Fig. 13 any suitable number of opportunities to transmit in relation to the opportunities given to the storage units shown in Figs. 8 and 9. As shown in Fig. 12 and with key 1217 normal, the storage equipment shown in Fig. 13 is given three opportunities to transmit for every opportunity given to either one of the storage repeaters shown in Figs. 8 and 9. In other words, an opportunity is given for the transmission of three messages from the storage equipment shown in Fig. 13 and when an opportunity is given for the transmission of messages shown in Fig. 8, then three more turns are given to the equipment shown in Fig. 13, and then one turn to the equipment shown in Fig. 9 after which the above cycle is repeated.

If no messages are awaiting transmission in the equipment shown in Fig. 8 then the equipment shown in Fig. 9 will be permitted to transmit messages awaiting transmission therefrom one-third as often as opportunities will be provided for the transmission of messages from Fig. 13. In other words, three messages will be transmitted from the storage equipment of Fig. 13 for every one message transmitted from the equipment shown in Fig. 9. In case messages are stored awaiting transmission in the equipment shown in Fig. 8 and none are awaiting transmission from the storage repeater shown in Fig. 9, for every three messages transmitted from the equipment shown in Fig. 13 an opportunity will be granted to transmit one message from the equipment shown in Fig. 8.

If no messages are awaiting transmission from the equipment shown in Fig. 13 the opportunities or turns to transmit from this equipment will be lost and the equipment shown in the other figures permitted to send messages awaiting transmission from them alternately or from either of them if messages are stored in only one of them.

In the foregoing description it has been assumed that key 1217 has been normal or not operated. As indicated above, it is sometimes desirable to quickly change the relative number of turns assigned to each of the transmitters or to each of the groups of transmitters.

Key 1217 has been provided to vary the relative number of turns assigned to the different groups. Operation of key 1217 connects battery to the associated contacts of the bank of brush arm 1215. As shown in the drawing, one-third of the contacts normally connected to the upper break contact of relay 1204 are disconnected therefrom and connected to battery upon the operation of key 1217. Consequently, with key 1217 operated, a circuit will be completed for the operation of relay 1214 as soon as brush arm 1215 steps on one of these contacts. As a result, brush arm 1215 will be stepped to the next terminal as described above.

The operation of key 1217 disconnects a corresponding one-third of the contacts normally connected to the winding of relay 1201 so that relay 1201 will not be operated when brush arm 1216 makes contact with these contacts. Thus, the switch steps over these contacts when key 1217 is operated without causing the operation of relay 1201.

Under these conditions, the equipment shown in Fig. 13 transmits two instead of three messages for every message transmitted from the equipment shown in Figs. 8 and 9, of course, assuming that messages are awaiting transmission from both groups of equipment.

As will be at once apparent to those skilled in the art, one or more additional keys similar to key 1217 may be provided and these additional keys as well as key 1217 may be connected to as many of the contacts as desired and thus cause turns normally assigned to any of the transmitting apparatus or groups of transmitting apparatus to be lost which effectively changes the ratio, frequency or relation of turns assigned to the respective devices or groups of devices.

In the specific arrangement shown in the drawing the operator or attendant at the central switching center will be instructed not to operate key 1217 during transmission over any of the lines. Instead, the instructions will be to first operate the hold keys 814, 914, and 1314. These keys may be operated during transmission from any of the transmitters and cause the operation of the respective relays 715, 724, and 1207. These relays in turn cause the release of the respective relays 710, 719, and 1204.

The release of these relays does not in any way interfere with the message being transmitted at the time keys 814, 914, and 1314 are operated but does prevent the transmission of any messages following the message being transmitted at that time.

After the message being transmitted when keys 814, 914, and 1314 are operated has been fully transmitted, the operator or attendant will operate key 1217 or any or all of the keys similar to key 1217 and then restore the keys 814, 914, and 1314 after which the transmission of messages will be resumed in the manner described above.

The operator may restore any or all of the keys 1217 at any time or keys 814, 914, and 1314 may be operated first and then after the message then in the progress of transmission has been fully transmitted key 1217 may be restored and then keys 814, 914, and 1314 restored and the transmission resumed.

As will be obvious to those skilled in the art, the connections to the bank terminals cooperating with brushes 1215 and 1216 may be arranged to give any desired sequence or proportion of turns to any of the storage repeaters. For example, by merely rearranging the connections to these bank terminals the storage apparatus in Figs. 8 and 9 may be given more opportunities to transmit messages stored therein than is given to the equipment shown in Fig. 13. However, under the assumed conditions and with key 1217 normal, three opportunities to transmit from the equipment shown in Fig. 13 are provided for every opportunity to transmit from the equipment of either Fig. 8 or 9.

During the transmission of any of the messages over the receiving channel 211 of the party line 210 it may be desirable to interrupt message transmission and transmit a transmitter start pattern to cause the starting of any of the transmitters from any of the stations associated with the party line 210. The operation of transmitter start equipment for transmitting signals of this type was described in detail in the above-identified patent to Branson et al. The equipment in the system disclosed herein operates in substantially the same manner. When it is desired to transmit transmitter start signals from the transmitter start circuit 310, relays 619 and 1211 are operated. The operation of these relays will interrupt the circuit of any one of the transfer magnets 811, 911 or 1311 which may be operated and thus interrupt the transmission of messages stored in the respective tapes 830, 930 or 1130.

As described in the above-identified patent to Branson et al. the same transmitting distributor previously employed for the transmission of message material is employed for transmitting the transmitter start signals over the party line. However, in the present circuit arrangement only the transmitting distributors of the equipment shown in Figs. 8 and 9 is employed to transmit signals under control of the transmitter start circuit 310 over the party line. The transmitting distributor equipment employed to transmit these signals will be the one shown in Fig. 8 or 9 which was the last one employed to transmit message signals over the party line. If the message is being transmitted from the equipment shown in Fig. 13, this equipment will be stopped due to the operation of relay 1211 and then the transmitting distributor shown in either Fig. 8 or 9 employed to transmit the transmitter start signals under control of the transmitter start circuit 310.

While it was assumed above that provisions were made for transmitting messages to the recording equipment 229 at station 219 in a definite order or sequence which provided more opportunities to transmit messages to this station, it will be readily apparent to those skilled in the art that the circuits will function to give messages to any group of stations more expeditious transmission than messages to other stations. The circuits will also function so that messages of one particular class of service would be directed to the storage equipment shown in Fig. 13 which provided more opportunities to transmit to any one, a group, or all of the stations of the party line than are provided for messages of another class of service dependent, of course, upon the address codes preceding the respective messages. For example, when it is desired to transmit messages of both classes to any one or more stations, each of the stations to which it is desired to send messages of more than one class will be assigned additional address codes for each class of message to be sent thereto.

As indicated above, it is also possible to direct the messages of a superior class of service to the storage equipment shown in Fig. 8 or 9 by transmitting the proper address ahead of the message, if these messages comprise the bulk of the messages, and to direct messages of the inferior class of service or to inferior stations to the equipment shown in Fig. 13.

It will be quite apparent to those skilled in the art that in order to accomplish any of the results desired, it is only necessary to properly assign suitable address codes to the respective stations which address codes are transmitted preceding messages intended for these stations and then to appropriately cross-connect the contacts of the stepping switch shown in Fig. 12 and also the switching and selector circuits of the directors 1501 to the appropriate leads through the intercept circuit to the recording circuits of the respective storing instruments.

Thus, according to the present invention, a flexible system is provided in which either one or more stations may be provided with a superior or inferior telegraph service or alternatively in which messages of two different classes of service may be transmitted selectively to any one or more of the stations of a comprehensive telegraph system. It is also possible to arrange the system to provide both types of service, that is, to provide certain stations with a superior or inferior telegraph service and at the same time provide two classes of service for all of the telegraph systems. Furthermore, by merely duplicating the equipment for the different classes of service described herein, it is possible to provide more than two classes of service as will be readily understood by persons skilled in the art.

What is claimed is:

1. An improvement in telegraph systems comprising an outgoing channel of transmission, a plurality of pulse transmitters for transmitting over said channel one at a time, storage means for each of said transmitters, means for selectively directing to one or another of said storage means a group of message codes constituting a message, program means for assigning turns of transmission to those of said transmitters which have messages supplied to their storage means, means in said program means for assigning more turns of transmission to one transmitter than another, and manual switching apparatus for varying the number of said more turns assigned to said one transmitter.

2. A system comprising a plurality of transmitters each controlled by storage means wherein the messages for transmission are stored, automatic selective means for selectively directing certain messages selectively to the storage means of a selected one of said transmitters, programming means for assigning turns of transmission to said transmitters, and elements included in said programming means for assigning more turns of transmission to said one transmitter than to other of said transmitters.

3. A system comprising an outgoing channel of transmission, a plurality of impulse transmitters associated therewith for transmitting thereover one at a time, storage means for each of said transmitters, automatically operating selective means for selectively directing to one or another of said storage means a group of message codes constituting a message, program means for assigning turns of transmission to said transmitters with the transmission of a complete message upon each turn, and means in said program means for assigning more turns of transmission to one transmitter than to another.

4. A plurality of transmitters each associated with an outgoing channel of transmission for transmitting thereover one at a time, storage means for controlling the transmission of said transmitters, automatically operating selective means for selectively directing to said storage means groups of code characters comprising a message each followed by one or more of the code characters constituting an end-of-message indication, means operable by passage through said transmitter of the end-of-message code group to terminate transmission from said transmitter, and means for testing another transmitter for transmissable material in combination with means for testing one transmitter more frequently than another.

5. A system comprising a plurality of storage controlled telegraph transmitters associated with an outgoing channel of transmission for transmitting thereover one at a time, automatically operating selective means for selectively directing to one or another of said transmitters messages each comprising message code combinations followed by an end-of-message code pattern, program means for testing said transmitters for transmission and initiating transmission therefrom upon affirmative test in combination with means operable by each end-of-message code pattern to advance said program means in its program cycle.

6. A telegraph system, a telegraph transmission path, a plurality of storage controlled telegraph transmitters capable of transmitting over said path, a program system and apparatus responsive to the existence of a supply of stored signals for any of said transmitters for conditioning said program system, means responsive to the conditioning of said system for offering transmission opportunities to said transmitters one at a time, circuit connections in said program system for causing one of said transmitters to transmit more frequently during said program than another of said transmitters, and manual operable switching apparatus for changing the frequency of transmission of one of said transmitters during said program.

7. A telegraph system, a telegraph transmission path, a plurality of storage controlled telegraph transmitters capable of transmitting over said path, a program system and apparatus responsive to the existence of a supply of stored signals for any of said transmitters for conditioning said program system, means responsive to the conditioning of said program system for offering transmission opportunities to said transmitters one at a time, and circuit connections in said program system for causing one of said transmitters to transmit more frequently during said program than another of said transmitters, in combination with a plurality of incoming channels of transmission for storing message groups of signals to control said transmitters, and selective means operable under control of certain code combinations associated with each group for determining its place of storage with respect to one or another of said transmitters.

8. A telegraph system, a telegraph transmission path, a plurality of storage controlled telegraph transmitters capable of transmitting over said path, a program system and apparatus responsive to the existence of a supply of stored signals for each of said transmitters for initiating operation of said program system, means responsive to the operation of said program system for starting said transmitters one at a time, and circuit connections in said program system for causing one of said transmitters to transmit more frequently during said program than another of said transmitters, in combination with a plurality of incoming channels of transmission for storing message groups of signals to control said transmitters, and selective means operable under control of certain code combinations associated with each message group for determining its place of storage.

9. A system of message transmitters, means for variably and at intervals supplying said transmitters with transmissible material, a hunting system for hunting over said transmitters according to a program whenever any one is supplied with transmissible material and initiating transmission from the first discovered to be so supplied, means whereby one of said transmitters is examined more frequently than another during said program, and means operable by and in accordance with message material transmitted from an active transmitter for stopping transmission therefrom and initiating hunting, in combination with a source of signals for supplying transmissible material to said transmitters, said transmissible material including message code combinations associated with other code combinations, and means controlled by the other code combinations for selectively determining to which transmitter said material is to be supplied.

10. A line having a group of receiving stations thereon, a plurality of storage transmitters for transmission over said line, automatic switching means for selectively directing messages for certain of said stations to certain of said storage transmitters and for selectively directing messages for other of said stations to other of said storage transmitters, means for offering opportunities for transmitting messages from certain of said transmitters more frequently than from others.

11. In combination, a telegraph transmission path, a first receiving device for receiving from said path, a second receiving device for also receiving from said path, a first transmitting device for transmitting messages over said path to said first receiving device, a second transmitting device for transmitting messages over said path to said second receiving device, and automatic selective switching apparatus for automatically directing messages for said first receiving device to said first transmitting device and automatically directing messages for said second receiving device to said second transmitting device.

12. A telegraph system, a plurality of receiving devices, a telegraph transmission path extending to said receiving devices, a plurality of storage controlled telegraph transmitters capable of transmitting over said path, a program system and apparatus responsive to the existence of a supply of stored signals for any of said transmitters for conditioning said program system, means responsive to the operation of said program system for permitting transmission from said transmitters one at a time, and circuit connections in said program system for permitting one of said transmitters to transmit more frequently during said program than another of said transmitters, in combination with a plurality of incoming channels of transmission for storing directing and message groups of signals to control said transmitters, and selective means operable under control of stored directing code combinations associated with each message group for directing messages for certain of said receiving devices to certain of said storage controlled telegraph transmitters.

13. A telegraph system, a telegraph transmission path, a plurality of storage controlled telegraph transmitters capable of transmitting over said path, a program system and apparatus responsive to the supply of stored signals for each of said transmitters for conditioning said program system, means responsive to the operation of said program system for starting said transmitters one at a time, and circuit connections in said program system for causing one of said transmitters to transmit more frequently during said program than another of said transmitters, in combination with sources of transmissible material comprising directing codes associated with message codes, and selective means controlled in accordance with the directing codes of each message for selectively directing its associated message to storage means associated with one of said transmitters for controlling its transmission in accordance with the storage thereof.

14. A system of message transmission comprising a plurality of telegraph message transmitters, means for variably and at intervals supplying said transmitters with transmissible material, a hunting system for hunting over said transmitters according to a program whenever any one is supplied with transmissible material, and initiating transmission from the first discovered to be so supplied, means whereby one of said transmitters is examined more frequently than another during said program, and means operable by and in accordance with message material transmitted from an active transmitter for stopping transmission therefrom and initiating hunting, in combination with a source of signals for supplying transmissible material to said transmitters, said transmissible material including message code combinations associated with other code combinations and means determined by the other code combinations for selectively determining in accordance with the destination of said message to which transmitter said material is to be supplied.

15. In combination, a telegraph transmission path, a first receiving device for receiving from said path, a second receiving device for also receiving from said path, a first transmitting device for transmitting messages over said path to said first receiving device, a second transmitting device for transmitting messages over said path to said second receiving device, automatic selective switching apparatus for automatically directing messages for said first receiving device to said first transmitting device and directing messages for said second receiving device to said second transmitting device, and control apparatus for assigning more transmission intervals to one of said transmitters than to the other of said transmitters when both are supplied with messages.

16. A system comprising a plurality of transmitters each provided with a storage means, said transmitters being associated with a stepping arrangement having contacts associated therewith for assigning periods of transmission to said transmitters in a predetermined order wherein more contacts are associated with one transmitter than another in combination with sources of coded impulse groups wherein each group normally consists of codes of address, codes of message and end-of-message codes, and selector means controlled in accordance with the address codes for selectively directing groups to one of several storage means including; but not excluding others, the storage means of said transmitters.

17. In an automatic telegraph switching system wherein messages are preceded by directing telegraph signals, a plurality of storage controlled telegraph transmitters, a line outgoing from said telegraph transmitters, a plurality of outlying stations connected to said line, automatic scheduling apparatus for scheduling the operation of said storage transmitters including apparatus for giving to certain of the transmitters more frequent opportunities to transmit than is given to other of transmitters, selective switching apparatus controlled by said directing codes for directing messages for certain of said stations to one of said transmitters and for directing messages for other of said stations to other of said transmitters.

WALTER M. BACON.

REFERENCES CITED

The following references are of record in the file of this patent:

UNITED STATES PATENTS

| Number | Name | Date |
| --- | --- | --- |
| 1,870,352 | Watson | Aug. 9, 1932 |
| 1,983,905 | Hoover | Dec. 11, 1934 |
| 2,172,920 | Anderson | Sept. 12, 1939 |
| 2,193,967 | Kleinschmidt | Mar. 19, 1940 |
| 2,279,295 | Blanton | Apr. 14, 1942 |
| 2,340,576 | Bacon | Feb. 1, 1944 |
| 2,369,935 | Bacon | Feb. 20, 1945 |